US010352409B2

(12) United States Patent
Jinnai et al.

(10) Patent No.: US 10,352,409 B2
(45) Date of Patent: Jul. 16, 2019

(54) MULTI-STAGE TRANSMISSION

(71) Applicant: AISIN AW CO., LTD., Anjo-shi, Aichi-ken (JP)

(72) Inventors: Naoya Jinnai, Anjo (JP); Shota Ikeda, Anjo (JP); Hiroshi Kato, Kariya (JP); Takuya Nakajima, Toyota (JP)

(73) Assignee: AISIN AW CO., LTD., Anjo (JP)

( * ) Notice: Subject to any disclaimer, the term of this patent is extended or adjusted under 35 U.S.C. 154(b) by 279 days.

(21) Appl. No.: 15/030,465

(22) PCT Filed: Nov. 25, 2014

(86) PCT No.: PCT/JP2014/081076
§ 371 (c)(1),
(2) Date: Apr. 19, 2016

(87) PCT Pub. No.: WO2015/080090
PCT Pub. Date: Jun. 4, 2015

(65) Prior Publication Data
US 2016/0273621 A1 Sep. 22, 2016

(30) Foreign Application Priority Data

Nov. 29, 2013 (JP) ................................ 2013-248655

(51) Int. Cl.
*F16D 25/0638* (2006.01)
*F16H 3/66* (2006.01)
(Continued)

(52) U.S. Cl.
CPC ......... *F16H 3/663* (2013.01); *F16H 61/0265* (2013.01); *F16D 2048/0212* (2013.01);
(Continued)

(58) Field of Classification Search
None
See application file for complete search history.

(56) References Cited

U.S. PATENT DOCUMENTS 3,650,364 A * 3/1972 Laing ...................... F16D 55/40
192/85.32
3,724,626 A 4/1973 Clauss, Jr. et al.
(Continued)

FOREIGN PATENT DOCUMENTS

DE 69906215 T2 12/2003
DE 102005062469 A1 7/2006
(Continued)

OTHER PUBLICATIONS

Mar. 3, 2015 Search Report issued in International Patent Application No. PCT/JP2014/081076.

*Primary Examiner* — Charles A Fox
*Assistant Examiner* — Ryan P Dodd
(74) *Attorney, Agent, or Firm* — Oliff PLC

(57) ABSTRACT

A brake of an automatic transmission includes: first and second recessed portions and formed in a center support; a first piston having a first pressure-receiving portion that is disposed in the first recessed portion and defines a first engagement oil chamber and having a plate-pressing portion that presses friction plates and separator plates; a second piston having a second pressure-receiving portion that is disposed in the second recessed portion and defines a second engagement oil chamber and a piston-pressing portion that presses the first piston by supply of oil pressure to the second engagement oil chamber; and a return spring that biases the first piston so that the first piston moves away from the friction plates and the separator plates.

20 Claims, 7 Drawing Sheets

(51) Int. Cl.
*F16H 61/02* (2006.01)
*F16D 48/02* (2006.01)
*F16H 63/30* (2006.01)
*F16D 125/10* (2012.01)

(52) U.S. Cl.
CPC ...... *F16D 2125/10* (2013.01); *F16H 63/3026* (2013.01); *F16H 2063/303* (2013.01); *F16H 2200/0069* (2013.01); *F16H 2200/201* (2013.01); *F16H 2200/2023* (2013.01); *F16H 2200/2046* (2013.01)

(56) References Cited

U.S. PATENT DOCUMENTS

| | | | |
|---|---|---|---|
| 4,560,034 A * | 12/1985 | Windish | F24D 11/0214 |
| | | | 188/72.3 |
| 5,511,644 A * | 4/1996 | Murata | F16D 13/52 |
| | | | 192/109 F |
| 5,701,976 A * | 12/1997 | Kumagai | F16D 55/40 |
| | | | 188/71.5 |
| 5,950,787 A * | 9/1999 | Murasugi | F16D 25/06 |
| | | | 192/106 F |
| 6,176,802 B1 | 1/2001 | Kasuya et al. | |
| 6,609,439 B1 | 8/2003 | Yamaguchi | |
| 9,765,882 B2 * | 9/2017 | Hirai | F16H 61/0265 |
| 9,927,027 B2 * | 3/2018 | Niimi | F16H 63/3026 |
| 2006/0054444 A1 | 3/2006 | Bishop et al. | |
| 2006/0142112 A1 | 6/2006 | Kamada et al. | |
| 2009/0007709 A1 | 1/2009 | Sugita et al. | |
| 2013/0277168 A1 | 10/2013 | Dwenger | |

FOREIGN PATENT DOCUMENTS

| | | |
|---|---|---|
| DE | 102009019811 A1 | 11/2010 |
| DE | 102013206816 A1 | 10/2013 |
| JP | H04-90738 U | 8/1992 |
| JP | 2000-199549 A | 7/2000 |
| JP | 2001-032928 A | 2/2001 |
| JP | 2001-116121 A | 4/2001 |
| JP | 2004-251310 A | 9/2004 |
| JP | 2005-265063 A | 9/2005 |
| JP | 2005265063 A * | 9/2005 |
| JP | 2007-024303 A | 2/2007 |
| JP | 2007-064400 A | 3/2007 |

\* cited by examiner

FIG. 3

|  | C1 | C2 | C3 | C4 | B1 | B2 | GEAR RATIO | STEP RATIO |
|---|---|---|---|---|---|---|---|---|
| 1st | ○ | ○ | – | – | – | ○ | 5.091 | 1.581 |
| 2nd | ○ | – | – | – | ○ | ○ | 3.219 | 1.385 |
| 3rd | – | ○ | – | – | ○ | ○ | 2.324 | 1.232 |
| 4th | – | – | – | ○ | ○ | ○ | 1.886 | 1.265 |
| 5th | – | ○ | – | ○ | ○ | – | 1.491 | 1.251 |
| 6th | ○ | – | – | ○ | ○ | – | 1.192 | 1.192 |
| 7th | ○ | – | ○ | ○ | – | – | 1.000 | 1.273 |
| 8th | – | – | ○ | ○ | ○ | – | 0.785 | 1.242 |
| 9th | ○ | – | ○ | – | ○ | – | 0.632 | 1.076 |
| 10th | – | ○ | ○ | – | ○ | – | 0.588 | 0.955 |
| REV. | – | ○ | ○ | – | – | ○ | -4.860 |  |
|  | ※"○": ENGAGED, "–": DISENGAGED | | | | | | SPREAD | 8.660 |

MULTI-STAGE TRANSMISSION

TECHNICAL FIELD

Preferred embodiments of the present disclosure relate to a multi-stage transmission including a brake that connects an element to be held out of a plurality of rotating elements to a case to hold stationary the element to be held and releases this connection, and configured to change the speed of power transmitted from a motor of a vehicle to an input member to transmit the power to an output member.

BACKGROUND ART

Conventionally, as a brake included in a transmission of this type, a brake has been known having: one piston that is slidable in a case or a cylinder coupled to the case, and causes friction members and disk plates to engage with and disengage from each other; a first oil pressure chamber provided to the piston; a second oil pressure chamber provided to the piston separately from the first oil pressure chamber; and a return spring that continuously biases the piston toward the first and the second oil pressure chambers (see Patent Documents 1 and 2, for example). In such a brake, engagement oil pressure (hydraulic oil) is supplied to either one of the first and the second oil pressure chambers when the torque share becomes relatively low, and the engagement oil pressure is supplied to both of the first and the second oil pressure chambers when the torque share becomes relatively high.

RELATED ART DOCUMENTS

Patent Document

Patent Document 1: Japanese Patent Application Publication No. 2001-032928 (JP 2001-032928 A)
Patent Document 2: Japanese Patent Application Publication No. 2007-064400 (JP 2007-064400 A)

SUMMARY

However, in this conventional brake, when engagement oil pressure is supplied to only one of the first and the second oil pressure chambers, the pressure inside the other of the first and the second oil pressure chambers becomes negative due to movement of the piston. This may prevent smooth movement of the piston, so that the shifting performance deteriorates.

In view of this, an object of a preferred embodiment is to improve the shifting performance of a multi-stage transmission including a brake having two engagement oil chambers.

A multi-stage transmission according to a preferred embodiment is a multi-stage transmission including a brake that connects an element to be held out of a plurality of rotating elements to a case to hold stationary the element to be held and releases this connection, and configured to change speed of power transmitted from a motor of a vehicle to an input member to transmit the power to an output member, in which the brake comprises: a brake hub continuously coupled to the element to be held;
a first friction engagement plate fitted onto the brake hub;
a second friction engagement plate fitted onto the case;
first and second recessed portions formed in part of the case;
a first piston having a first pressure-receiving portion and a plate-pressing portion, the first pressure-receiving portion being disposed in the first recessed portion and together with part of the case defining a first engagement oil chamber, the plate-pressing portion pressing the first and the second friction engagement plates;
a second piston having a second pressure-receiving portion and a piston-pressing portion, the second pressure-receiving portion being disposed in the second recessed portion and together with part of the case defining a second engagement oil chamber, the piston-pressing portion being brought into contact with part of the first piston by supply of oil pressure to the second engagement oil chamber and pressing the first piston; and
a return spring that biases the first piston so that the first piston moves away from the first and the second friction engagement plates.

In the brake of this multi-stage transmission, if oil pressure (hydraulic oil) is supplied only to the first engagement oil chamber, the first piston is moved by the force of the oil pressure in the first engagement oil chamber so as to press the first and the second friction engagement plates against the biasing force of the return spring, whereby the first and the second friction engagement plates can be caused to frictionally engage with each other. When oil pressure is supplied only to the first engagement oil chamber, the second piston stays stationary in the second recessed portion formed in part of the case, so that the pressure in the second engagement oil chamber does not become negative. Thus, when oil pressure is supplied only to the first engagement oil chamber, movement of the first piston is not hindered due to the state of the second piston or the pressure condition in the second engagement oil chamber, so that the first piston can be smoothly moved in accordance with the oil pressure to the first engagement oil chamber. Furthermore, if oil pressure is supplied to both of the first and the second engagement oil chambers, the second piston is brought into contact with part of the first piston by the supply of the oil pressure to the second engagement oil chamber, and presses the first piston. Accordingly, the first piston, receiving both the force of the oil pressure in the first engagement oil chamber and the force of the oil pressure in the second engagement oil chamber transmitted via the second piston, presses the first and the second friction engagement plates. Consequently, whether the torque share of the brake is high or low, an oil pressure in accordance with the torque share is suitably exerted on the first piston that presses the first and the second friction engagement plates to smoothly move the first piston, and thus the shifting performance of the multi-stage transmission can be improved. In the brake included in the multi-stage transmission according to a preferred embodiment, needless to say, even if oil pressure is supplied only to the second engagement oil chamber, the force of the oil pressure in the second engagement oil chamber causes the first and the second pistons to move so as to press the first and the second friction engagement plates against the biasing force of the return spring, causing the first and the second friction engagement plates to frictionally engage with each other.

BRIEF DESCRIPTION OF THE DRAWINGS

FIG. 3 is an operation table illustrating a relation between each shift speed and operating states of clutches and brakes in the multi-stage transmission according to a preferred embodiment.

DESCRIPTION

Modes for carrying out preferred embodiments will now be described with reference to the drawings.

Figure 1:
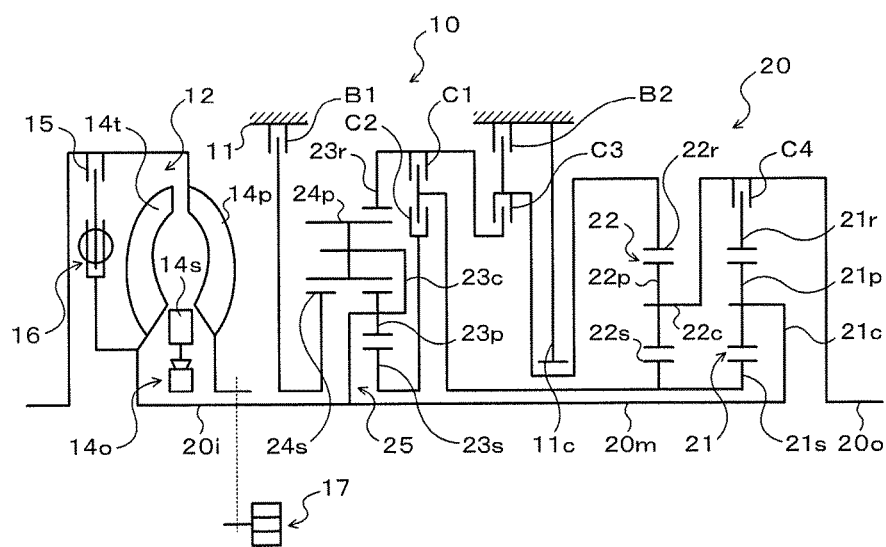
FIG. 1 is a schematic structure diagram illustrating a power transmission apparatus including a multi-stage transmission according to a preferred embodiment.

FIG. 1 is a schematic structure diagram of a power transmission apparatus 10 including an automatic transmission 20 as a multi-stage transmission according to one embodiment. The power transmission apparatus 10 depicted in the drawing is an apparatus that is connected to a crankshaft of an engine (internal combustion engine) and/or a rotor of an electric motor (not depicted) as a drive source that is longitudinally mounted in a front area of a rear-wheel-drive vehicle, and can transmit power (torque) from the engine or other sources to right and left rear wheels (drive wheels) (not depicted). As depicted in the drawing, the power transmission apparatus 10 includes a transmission case (stationary member) 11, a starting device (fluid transmission apparatus) 12, and an oil pump 17, in addition to the automatic transmission 20 that changes the speed of power transmitted from the engine or other sources to an input shaft 20$i$ to transmit the power to an output shaft 20$o$.

The starting device 12 includes a torque converter including: a pump impeller 14$p$ on the input side, which is coupled to a drive source as described above; a turbine runner 14$t$ on the output side, which is coupled to the input shaft (input member) 20$i$ of the automatic transmission 20; a stator 14$s$ that is disposed between the pump impeller 14$p$ and the turbine runner 14$t$ to adjust a flow of hydraulic oil from the turbine runner 14$t$ to the pump impeller 14$p$; and a one-way clutch 14$o$ that is supported by a stator shaft (not depicted) to restrict the rotation direction of the stator 14$s$ to one direction. The starting device 12 further includes: a lockup clutch 15 that interconnects a front cover coupled to the crankshaft or other members of the engine with the input shaft 20$i$ of the automatic transmission 20, and releases this interconnection; and a damper mechanism 16 that damps vibrations between the front cover and the input shaft 20$i$ of the automatic transmission 20. Herein, the starting device 12 may include a fluid coupling that does not have the stator 14$s$.

The oil pump 17 is structured as a gear pump including: a pump assembly including a pump body and a pump cover; an external gear (inner rotor) coupled to the pump impeller 14$p$ of the starting device 12 via a chain or a gear train; and an internal gear (outer rotor) meshing with the external gear. The oil pump 17, driven by power from the engine or other sources draws hydraulic oil (ATF) stored in an oil pan (not depicted) and feeds the hydraulic oil into a hydraulic control apparatus 60 (see FIG. 4) in a pressurized manner.

The automatic transmission 20 is structured as a 10-speed transmission. As depicted in FIG. 1, in addition to the input shaft 20$i$, the automatic transmission 20 includes: the output shaft (output member) 20$o$ coupled to the right and left rear wheels via a differential gear and a drive shaft (not depicted); a first planetary gear 21 and a second planetary gear 22 that are of a single-pinion type and are disposed so as to be aligned in the axial direction of the automatic transmission 20 (the input shaft 20$i$ and the output shaft 20$o$); and a Ravigneaux type planetary gear mechanism 25 as a compound planetary gear mechanism structured by combining a double-pinion type planetary gear and a single-pinion type planetary gear. The automatic transmission 20 further includes a clutch C1 (first clutch) as a first engagement element, a clutch C2 (second clutch) as a second engagement element, a clutch C3 (third clutch) as a third engagement element, a clutch C4 (fourth clutch) as a fourth engagement element, a brake B1 (first brake) as a fifth engagement element, and a brake B2 (second brake) as a sixth engagement element that are configured to change power transfer paths from the input shaft 20$i$ to the output shaft 20$o$.

In the present embodiment, the first and the second planetary gears 21 and 22 and the Ravigneaux type planetary gear mechanism 25 are disposed in the transmission case 11 so that the Ravigneaux type planetary gear mechanism 25, the second planetary gear 22, and the first planetary gear 21 are aligned in this order from the starting device 12, or the engine side (left side in FIG. 1). More specifically, the single-pinion type planetary gear that is a component of the Ravigneaux type planetary gear mechanism 25, the double-pinion type planetary gear that is a component of the Ravigneaux type planetary gear mechanism 25, the second planetary gear 22, and the first planetary gear 21 are aligned in this order. Consequently, the Ravigneaux type planetary gear mechanism 25 is disposed anteriorly in a vehicle so as to be positioned close to the starting device 12. The first planetary gear 21 is disposed posteriorly in the vehicle so as to be positioned close to the output shaft 20$o$. Furthermore, the second planetary gear 22 is disposed between the Ravigneaux type planetary gear mechanism 25 and the first planetary gear 21 in the axial direction of the input shaft 20$i$ and the output shaft 20$o$, for example.

The first planetary gear 21 includes a first sun gear 21$s$ that is an external gear, a first ring gear 21$r$ that is an internal gear disposed concentrically with the first sun gear 21$s$, a plurality of first pinion gears 21$p$ each meshing with the first sun gear 21$s$ and the first ring gear 21$r$, and a first carrier 21$c$ rotatably and revolvably holding the first pinion gears 21$p$. In the present embodiment, the gear ratio λ1 of the first planetary gear 21 (the number of teeth of the first sun gear 21$s$/the number of teeth of the first ring gear 21$r$) is determined to be λ1=0.277, for example.

As depicted in FIG. 1, the first carrier 21$c$ of the first planetary gear 21 is continuously coupled (fixed) to an intermediate shaft 20$m$ of the automatic transmission 20 coupled to the input shaft 20$i$. Consequently, when power is transmitted from the engine or other sources to the input shaft 20$i$, the power from the engine or other sources is continuously transmitted to the first carrier 21$c$ via the input shaft 20$i$ and the intermediate shaft 20$m$. The first carrier 21$c$ functions as an input element (first input element of the automatic transmission 20) of the first planetary gear 21 during engagement of the clutch C4, and idles during disengagement of the clutch C4. The first ring gear 21$r$ functions as an output element (first output element of the automatic transmission 20) of the first planetary gear 21 during engagement of the clutch C4.

The second planetary gear 22 includes a second sun gear 22s that is an external gear, a second ring gear 22r that is an internal gear disposed concentrically with the second sun gear 22s, a plurality of second pinion gears 22p each meshing with the second sun gear 22s and the second ring gear 22r, and a second carrier (planetary carrier) 22c rotatably and revolvably holding the second pinion gears 22p. In the present embodiment, the gear ratio λ2 (the number of teeth of the second sun gear 22s/the number of teeth of the second ring gear 22r) of the second planetary gear 22 is determined to be λ2=0.244, for example.

As depicted in FIG. 1, the second sun gear 22s of the second planetary gear 22 is integrated (continuously coupled) with the first sun gear 21s of the first planetary gear 21, and rotates or stops in a manner continuously integrated (and coaxially) with the first sun gear 21s. Herein, the first sun gear 21s and the second sun gear 22s may be continuously coupled together via a coupling member (first coupling member) (not depicted) that is separately configured. The second carrier 22c of the second planetary gear 22 is continuously coupled to the output shaft 20o, and rotates or stops in a manner continuously integrated (and coaxially) with the output shaft 20o. Accordingly, the second carrier 22c functions as an output element (second output element of the automatic transmission 20) of the second planetary gear 22. Furthermore, the second ring gear 22r of the second planetary gear 22 functions as a fixable element (first fixable element of the automatic transmission 20) of the second planetary gear 22.

The Ravigneaux type planetary gear mechanism 25 includes: a third sun gear 23s and a fourth sun gear 24s that are external gears; a third ring gear 23r that is an internal gear disposed concentrically with the third sun gear 23s; a plurality of third pinion gears (short pinion gears) 23p meshing with the third sun gear 23s; a plurality of fourth pinion gears (long pinion gears) 24p meshing with the fourth sun gear 24s and the third pinion gears 23p and also meshing with the third ring gear 23r; and a third carrier 23c rotatably and revolvably holding the third pinion gears 23p and the fourth pinion gears 24p.

This Ravigneaux type planetary gear mechanism 25 is a compound planetary gear mechanism structured by combining the double-pinion type planetary gear (third planetary gear) and the single-pinion type planetary gear (fourth planetary gear). In other words, the third sun gear 23s, the third carrier 23c, the third and the fourth pinion gears 23p and 24p, and the third ring gear 23r of the Ravigneaux type planetary gear mechanism 25 constitute the third planetary gear of a double-pinion type. The fourth sun gear 24s, the third carrier 23c, the fourth pinion gears 24p, and the third ring gear 23r of the Ravigneaux type planetary gear mechanism 25 constitute the fourth planetary gear of the single-pinion type. In the present embodiment, the Ravigneaux type planetary gear mechanism 25 is structured such that the gear ratio λ3 (the number of teeth of the third sun gear 23s/the number of teeth of the third ring gear 23r) of the third planetary gear of the double-pinion type is λ3=0.488, for example, and the gear ratio λ4 (the number of teeth of the fourth sun gear 24s/the number of teeth of the third ring gear 23r) of the fourth planetary gear of the single-pinion type is λ4=0.581, for example.

Out of rotating elements constituting the Ravigneaux type planetary gear mechanism 25 (third and fourth planetary gears), the fourth sun gear 24s functions as a fixable element (second fixable element of the automatic transmission 20) of the Ravigneaux type planetary gear mechanism 25. Furthermore, as depicted in FIG. 1, the third carrier 23c is continuously coupled (fixed) to the input shaft 20i, and also continuously coupled to the first carrier 21c of the first planetary gear 21 via the intermediate shaft 20m as a coupling member (second coupling member). Consequently, when power is transmitted from the engine or other sources to the input shaft 20i, the power from the engine or other sources is continuously transmitted to the third carrier 23c via the input shaft 20i. Thus, the third carrier 23c functions as an input element (second input element of the automatic transmission 20) of the Ravigneaux type planetary gear mechanism 25. The third ring gear 23r functions as a first output element of the Ravigneaux type planetary gear mechanism 25, and the third sun gear 23s functions as a second output element of the Ravigneaux type planetary gear mechanism 25.

The clutch C1 interconnects the third ring gear 23r that is the first output element of the Ravigneaux type planetary gear mechanism 25 with the first sun gear 21s of the first planetary gear 21 and the second sun gear 22s of the second planetary gear 22 that are continuously coupled together and releases this interconnection. The clutch C2 interconnects the third sun gear 23s that is the second output element of the Ravigneaux type planetary gear mechanism 25 with the first sun gear 21s of the first planetary gear 21 and the second sun gear 22s of the second planetary gear 22 that are continuously coupled together and releases this interconnection. The clutch C3 interconnects the second ring gear 22r of the second planetary gear 22 with the third ring gear 23r that is the first output element of the Ravigneaux type planetary gear mechanism 25 and releases this interconnection. The clutch C4 interconnects the first ring gear 21r that is the output element of the first planetary gear 21 with the output shaft 20o and releases this interconnection.

The brake B1 holds (connects) the fourth sun gear 24s that is a fixable element of the Ravigneaux type planetary gear mechanism 25 stationary with respect to the transmission case 11 as a stationary member, and also rotatably releases the fourth sun gear 24s from the transmission case 11. The brake B2 holds (connects) the second ring gear 22r that is a fixable element of the second planetary gear 22 stationary with respect to the transmission case 11, and also rotatably releases the second ring gear 22r from the transmission case 11 as a stationary member.

In the present embodiment, as the clutches C1 to C4, multi-plate friction type hydraulic clutches (friction engagement elements) are used each including: a piston; a plurality of friction engagement plates (e.g., friction plates each structured with an annular member on both sides of which friction material is bonded, and separator plates that are each an annular member both sides of which are smoothly formed); and a hydraulic servo including an engagement oil chamber and a centrifugal oil pressure cancel chamber to each of which hydraulic oil is supplied. As brakes B1 and B2, multi-plate friction type hydraulic brakes are used each including: a piston; a plurality of friction engagement plates (friction plates and separator plates); and a hydraulic servo including an engagement oil chamber to which hydraulic oil is supplied. The clutches C1 to C4 and the brakes B1 and B2 operate with hydraulic oil supplied and discharged by the hydraulic control apparatus 60.

Figure 2:
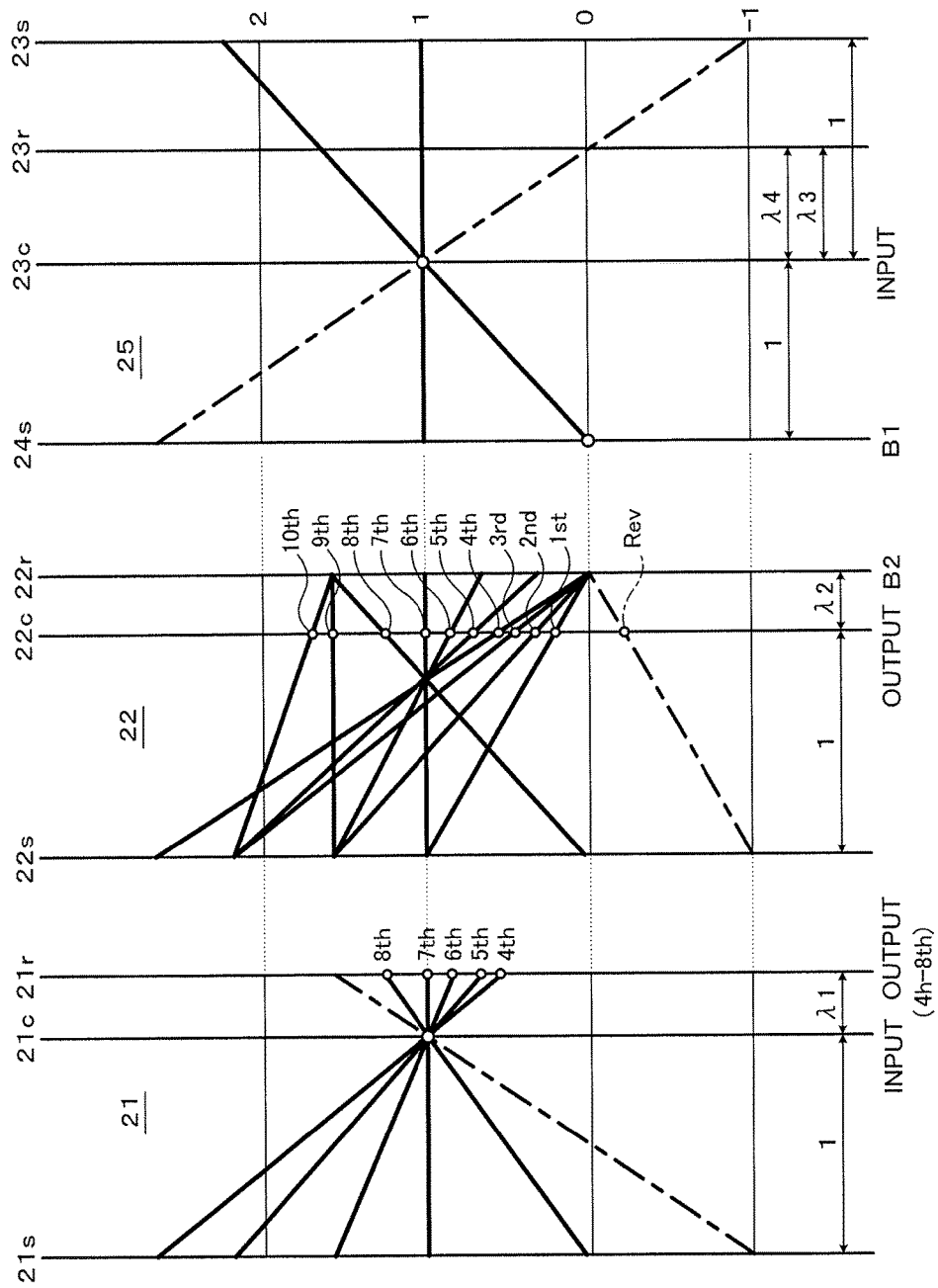
FIG. 2 is a speed diagram illustrating the ratio of the rotation speed of each rotating element to the input rotation speed in the multi-stage transmission according to a preferred embodiment.

FIG. 2 is a speed diagram illustrating the ratio of the rotation speed of each rotating element to the rotation speed (input rotation speed) of the input shaft 20i in the automatic transmission 20 (herein, the rotation speed of the input shaft 20i, i.e., the first carrier 21c and the third carrier 23c is assumed to be a value of 1). FIG. 3 is an operation table illustrating a relation between each shift speed and operating states of the clutches C1 to C4 and the brakes B1 and B2 in the automatic transmission 20.

As depicted in FIG. 2, three rotating elements constituting the first planetary gear 21 of the single-pinion type, i.e., the first sun gear 21$s$, the first ring gear 21$r$, and the first carrier 21$c$ are aligned, on the speed diagram of the first planetary gear 21 (speed diagram in the left of FIG. 2), in the order of the first sun gear 21$s$, the first carrier 21$c$, and the first ring gear 21$r$ from the left in the drawing at intervals corresponding to the gear ratio λ1. In accordance with the alignment order of this speed diagram, in one preferred embodiment, the first sun gear 21$s$ is the first rotating element of the automatic transmission 20, the first carrier 21$c$ is the second rotating element of the automatic transmission 20, and the first ring gear 21$r$ is the third rotating element of the automatic transmission 20. Thus, the first planetary gear 21 includes the first rotating element, the second rotating element, and the third rotating element of the automatic transmission 20 that are aligned in order at intervals corresponding to the gear ratio λ1 on the speed diagram.

Three rotating elements constituting the second planetary gear 22 of the single-pinion type, i.e., the second sun gear 22$s$, the second ring gear 22$r$, and the second carrier 22$c$ are aligned, on the speed diagram of the second planetary gear 22 (speed diagram in the center of FIG. 2), in the order of the second sun gear 22$s$, the second carrier 22$c$, and the second ring gear 22$r$ from the left in the drawing at intervals corresponding to the gear ratio λ2. In accordance with the alignment order of this speed diagram, in one preferred embodiment, the second sun gear 22$s$ is the fourth rotating element of the automatic transmission 20, the second carrier 22$c$ is the fifth rotating element of the automatic transmission 20, and the second ring gear 22$r$ is the sixth rotating element of the automatic transmission 20. Thus, the second planetary gear 22 includes the fourth rotating element, the fifth rotating element, and the sixth rotating element of the automatic transmission 20 that are aligned in order at intervals corresponding to the gear ratio λ2 on the speed diagram.

Furthermore, four rotating elements constituting the Ravigneaux type planetary gear mechanism 25, i.e., the fourth sun gear 24$s$ as the fixable element, the third carrier 23$c$ as the input element, the third ring gear 23$r$ as the first output element, and the third sun gear 23$s$ as the second output element are aligned in this order from the left in the drawing at intervals corresponding to the gear ratio λ3 of the third planetary gear of the double-pinion type and the gear ratio λ4 of the fourth planetary gear of the single-pinion type on the speed diagram of the Ravigneaux type planetary gear mechanism 25 (speed diagram in the right of FIG. 2). In accordance with the alignment order of this speed diagram, in one preferred embodiment, the fourth sun gear 24$s$ is the seventh rotating element of the automatic transmission 20, the third carrier 23$c$ is the eighth rotating element of the automatic transmission 20, the third ring gear 23$r$ is the ninth rotating element of the automatic transmission 20, and the third sun gear 23$s$ is the tenth rotating element of the automatic transmission 20. Thus, the Ravigneaux type planetary gear mechanism 25 includes the seventh rotating element, the eighth rotating element, the ninth rotating element, and the tenth rotating element of the automatic transmission 20 that are aligned in order at intervals corresponding to the gear ratios λ3 and λ4 on the speed diagram.

In the automatic transmission 20, as presented in FIG. 3, the clutches C1 to C4 and the brakes B1 and B2 are engaged or disengaged to change the connection relation of the first to the tenth rotating elements (which are substantially nine rotating elements in total because the first rotating element and the fourth rotating element are continuously coupled together), whereby ten power transfer paths in the forward rotation direction and one power transfer path in the reverse rotation direction, i.e., the first to the tenth forward speeds and the reverse speed can be set between the input shaft 20$i$ and the output shaft 20$o$.

Specifically, the first forward speed is formed by engaging the clutches C1 and C2 and the brake B2, and disengaging the remaining clutches C3 and C4 and the brake B1. More specifically, when the first forward speed is formed, the first sun gear 21$s$ of the first planetary gear 21 and the second sun gear 22$s$ of the second planetary gear 22 are interconnected with the third ring gear 23$r$ (first output element) of the Ravigneaux type planetary gear mechanism 25 by the clutch C1. The first sun gear 21$s$ of the first planetary gear 21 and the second sun gear 22$s$ of the second planetary gear 22 are interconnected with the third sun gear 23$s$ (second output element) of the Ravigneaux type planetary gear mechanism 25 by the clutch C2. Furthermore, the second ring gear 22$r$ (fixable element) of the second planetary gear 22 is held stationary with respect to the transmission case 11 by the brake B2. In the present embodiment (when the gear ratios of the first and the second planetary gears 21 and 22 and the third and the fourth planetary gears are λ1=0.277, λ2=0.244, λ3=0.488, and λ4=0.581, respectively, the same applies hereinafter), the gear ratio (rotation speed of the input shaft 20$i$/rotation speed of the output shaft 20$o$) γ1 in the forward first speed is γ1=5.091.

The second forward speed is formed by engaging the clutch C1 and the brakes B1 and B2, and disengaging the remaining clutches C2, C3, and C4. Specifically, when the second forward speed is formed, the first sun gear 21$s$ of the first planetary gear 21 and the second sun gear 22$s$ of the second planetary gear 22 are interconnected with the third ring gear 23$r$ (first output element) of the Ravigneaux type planetary gear mechanism 25 by the clutch C1. The fourth sun gear 24$s$ (fixable element) of the Ravigneaux type planetary gear mechanism 25 is held stationary with respect to the transmission case 11 by the brake B1. Furthermore, the second ring gear 22$r$ (fixable element) of the second planetary gear 22 is held stationary with respect to the transmission case 11 by the brake B2. In the present embodiment, the gear ratio γ2 in the second forward speed is γ2=3.219. The step ratio between the first forward speed and the second forward speed is γ1/γ2=1.581.

The third forward speed is formed by engaging the clutch C2 and the brakes B1 and B2, and disengaging the remaining clutches C1, C3, and C4. Specifically, when the third forward speed is formed, the first sun gear 21$s$ of the first planetary gear 21 and the second sun gear 22$s$ of the second planetary gear 22 are interconnected with the third sun gear 23$s$ (second output element) of the Ravigneaux type planetary gear mechanism 25 by the clutch C2. The fourth sun gear 24$s$ (fixable element) of the Ravigneaux type planetary gear mechanism 25 is held stationary with respect to the transmission case 11 by the brake B1. Furthermore, the second ring gear 22$r$ (fixable element) of the second planetary gear 22 is held stationary with respect to the transmission case 11 by the brake B2. In the present embodiment, the gear ratio γ3 in the third forward speed is γ3=2.324. The step ratio between the second forward speed and the third forward speed is γ2/γ3=1.385.

The forward fourth speed is formed by engaging the clutch C4 and the brakes B1 and B2, and disengaging the remaining clutches C1, C2, and C3. Specifically, when the fourth forward speed is formed, the first ring gear 21r (output element) of the first planetary gear 21 is interconnected with the output shaft 20o by the clutch C4. The fourth sun gear 24s (fixable element) of the Ravigneaux type planetary gear mechanism 25 is held stationary with respect to the transmission case 11 by the brake B1. Furthermore, the second ring gear 22r (fixable element) of the second planetary gear 22 is held stationary with respect to the transmission case 11 by the brake B2. In the present embodiment, the gear ratio $\gamma 4$ in the fourth forward speed is $\gamma 4=1.886$. The step ratio between the third forward speed and the fourth forward speed is $\gamma 3/\gamma 4=1.232$.

The fifth forward speed is formed by engaging the clutches C2 and C4 and the brake B1, and disengaging the remaining clutches C1 and C3 and the brake B2. Specifically, when the fifth forward speed is formed, the first sun gear 21s of the first planetary gear 21 and the second sun gear 22s of the second planetary gear 22 are interconnected with the third sun gear 23s (second output element) of the Ravigneaux type planetary gear mechanism 25 by the clutch C2. The first ring gear 21r (output element) of the first planetary gear 21 is interconnected with the output shaft 20o by the clutch C4. Furthermore, the fourth sun gear 24s (fixable element) of the Ravigneaux type planetary gear mechanism 25 is held stationary with respect to the transmission case 11 by the brake B1. In the present embodiment, the gear ratio $\gamma 5$ in the fifth forward speed is $\gamma 5=1.491$. The step ratio between the fourth forward speed and the fifth forward speed is $\gamma 4/\gamma 5=1.265$.

The sixth forward speed is formed by engaging the clutches C1 and C4 and the brake B1, and disengaging the remaining clutches C2 and C3 and the brake B2. Specifically, when the sixth forward speed is formed, the first sun gear 21s of the first planetary gear 21 and the second sun gear 22s of the second planetary gear 22 are interconnected with the third ring gear 23r (first output element) of the Ravigneaux type planetary gear mechanism 25 by the clutch C1. The first ring gear 21r (output element) of the first planetary gear 21 is interconnected with the output shaft 20o by the clutch C4. Furthermore, the fourth sun gear 24s (fixable element) of the Ravigneaux type planetary gear mechanism 25 is held stationary with respect to the transmission case 11 by the brake B1. In the present embodiment, the gear ratio $\gamma 6$ in the sixth forward speed is $\gamma 6=1.192$. The step ratio between the fifth forward speed and the sixth forward speed is $\gamma 5/\gamma 6=1.251$.

The seventh forward speed is formed by engaging the clutches C1, C3, and C4, and disengaging the remaining clutch C2 and the brakes B1 and B2. Specifically, when the seventh forward speed is formed, the first sun gear 21s of the first planetary gear 21 and the second sun gear 22s of the second planetary gear 22 are interconnected with the third ring gear 23r (first output element) of the Ravigneaux type planetary gear mechanism 25 by the clutch C1. The second ring gear 22r of the second planetary gear 22 is interconnected with the third ring gear 23r (first output element) of the Ravigneaux type planetary gear mechanism 25 by the clutch C3. Furthermore, the first ring gear 21r (output element) of the first planetary gear 21 is interconnected with the output shaft 20o by the clutch C4. In the present embodiment, the gear ratio $\gamma 7$ in the seventh forward speed is $\gamma 7=1.000$. The step ratio between the sixth forward speed and the seventh forward speed is $\gamma 6/\gamma 7=1.192$.

The eighth forward speed is formed by engaging the clutches C3 and C4 and the brake B1, and disengaging the remaining clutches C1 and C2 and the brake B2. Specifically, when the eighth forward speed is formed, the second ring gear 22r of the second planetary gear 22 is interconnected with the third ring gear 23r (first output element) of the Ravigneaux type planetary gear mechanism 25 by the clutch C3. The first ring gear 21r (output element) of the first planetary gear 21 is interconnected with the output shaft 20o by the clutch C4. Furthermore, the fourth sun gear 24s (fixable element) of the Ravigneaux type planetary gear mechanism 25 is held stationary with respect to the transmission case 11 by the brake B1. In the present embodiment, the gear ratio $\gamma 8$ in the eighth forward speed is $\gamma 8=0.785$. The step ratio between the seventh forward speed and the eighth forward speed is $\gamma 7/\gamma 8=1.273$.

The ninth forward speed is formed by engaging the clutches C1 and C3 and the brake B1, and disengaging the remaining clutches C2 and C4 and the brake B2. Specifically, when the ninth forward speed is formed, the first sun gear 21s of the first planetary gear 21 and the second sun gear 22s of the second planetary gear 22 are interconnected with the third ring gear 23r (first output element) of the Ravigneaux type planetary gear mechanism 25 by the clutch C1. The second ring gear 22r of the second planetary gear 22 is interconnected with the third ring gear 23r (first output element) of the Ravigneaux type planetary gear mechanism 25 by the clutch C3. Furthermore, the fourth sun gear 24s (fixable element) of the Ravigneaux type planetary gear mechanism 25 is held stationary with respect to the transmission case 11 by the brake B1. In the present embodiment, the gear ratio $\gamma 9$ in the ninth forward speed is $\gamma 9=0.632$. The step ratio between the eighth forward speed and the ninth forward speed is $\gamma 8/\gamma 9=1.242$.

The tenth forward speed is formed by engaging the clutches C2 and C3 and the brake B1, and disengaging the remaining clutches C1 and C4 and the brake B2. Specifically, when the tenth forward speed is formed, the first sun gear 21s of the first planetary gear 21 and the second sun gear 22s of the second planetary gear 22 are interconnected with the third sun gear 23s (second output element) of the Ravigneaux type planetary gear mechanism 25 by the clutch C2. The second ring gear 22r of the second planetary gear 22 is interconnected with the third ring gear 23r (first output element) of the Ravigneaux type planetary gear mechanism 25 by the clutch C3. Furthermore, the fourth sun gear 24s (fixable element) of the Ravigneaux type planetary gear mechanism 25 is held stationary with respect to the transmission case 11 by the brake B1. In the present embodiment, the gear ratio $\gamma 10$ in the tenth forward speed is $\gamma 10=0.588$. The step ratio between the ninth forward speed and the tenth forward speed is $\gamma 9/\gamma 10=1.076$. The spread (gear ratio width=the gear ratio $\gamma 1$ of the first forward speed being the minimum shift speed/the gear ratio $\gamma 10$ of the tenth forward speed being the maximum shift speed) in the automatic transmission 20 is $\gamma 1/\gamma 10=8.660$.

The reverse speed is formed by engaging the clutches C2 and C3 and the brake B2, and disengaging the remaining clutches C1 and C4 and the brake B1. Specifically, when the reverse speed is formed, the first sun gear 21s of the first planetary gear 21 and the second sun gear 22s of the second planetary gear 22 are interconnected with the third sun gear 23s (second output element) of the Ravigneaux type planetary gear mechanism 25 by the clutch C2. The second ring gear 22r of the second planetary gear 22 is interconnected with the third ring gear 23r (first output element) of the Ravigneaux type planetary gear mechanism 25 by the clutch C3. Furthermore, the second ring gear 22r (fixable element) of the second planetary gear 22 is held stationary with respect to the transmission case 11 by the brake B2. In the present embodiment, the gear ratio γrev in the reverse speed is γrev=−4.860. The step ratio between the first forward speed and the reverse speed is | γrev/γ1|=0.955.

As described above, the automatic transmission 20 can provide the forward speeds from the first speed to the tenth speed and the reverse speed by engaging and disengaging the clutches C1 to C4 and the brakes B1 and B2. Consequently, in the automatic transmission 20, the spread can be increased (8.660 in the present embodiment) to improve fuel efficiency of the vehicle especially at a high vehicle speed and acceleration performance at each shift speed. Furthermore, the step ratio can be optimized (prevented from increasing) to improve shift feeling. Thus, the automatic transmission 20 can satisfactorily improve both fuel efficiency and drivability of the vehicle.

In the automatic transmission 20, by engaging any three engagement elements and disengaging the remaining three engagement elements out of six engagement elements, i.e., the clutches C1 to C4 and the brakes B1 and B2, the first forward speed to the tenth forward speed and the reverse speed are formed. This can reduce the number of engagement elements that are disengaged when each shift speed is formed in comparison with a transmission that, for example, engages two engagement elements and disengages the remaining four engagement elements out of six engagement elements of clutches and brakes to form a plurality of shift speeds. Consequently, drag loss caused by slight contact between members in the engagement elements that are disengaged when each shift speed is formed can be reduced, whereby the power transfer efficiency of the automatic transmission 20 can be further improved.

Furthermore, in the automatic transmission 20, in the same manner as in the case of the third carrier 23c (input element) of the Ravigneaux type planetary gear mechanism 25, the first carrier 21c (second rotating element) of the first planetary gear 21 is continuously coupled to the input shaft 20i via the intermediate shaft 20m. When the fourth forward speed to the eighth forward speed are formed, the first ring gear 21r (third rotating element) of the first planetary gear 21 is connected to the output shaft 20o (second carrier 22c of the second planetary gear 22) by the clutch C4. This can reduce the torque share of the clutch C4 in comparison with, for example, a clutch of a conventional transmission (see FIG. 2 and FIG. 3 in U.S. Pat. No. 8,202,190) in which a first ring gear (third rotating element) of a first planetary gear together with a second carrier (fifth rotating element) of a second planetary gear is continuously coupled to an output shaft, and a first carrier (second rotating element) of the first planetary gear is selectively connected to an input shaft, and the clutch selectively connects the first carrier (second rotating element) to the input shaft.

Specifically, in the automatic transmission 20, the first carrier 21c of the first planetary gear 21 is the second rotating element that is continuously coupled to the input shaft 20i, and the first ring gear 21r of the first planetary gear 21 is the third rotating element that is selectively connected to the output shaft 20o by the clutch C4. This can reduce torque transmitted through the engaged clutch C4 down to $1/(1+\lambda 1)$ in comparison with the clutch of the conventional transmission that selectively connects the first carrier to the input shaft. Thus, in the automatic transmission 20, the torque share of the clutch C4 can be satisfactorily reduced, so that the clutch C4 can be made compact in at least either one of the axial direction and the radial direction. Consequently, with the automatic transmission 20, both power transfer efficiency and drivability can be improved, and also the entire apparatus can be prevented from upsizing.

Single-pinion type planetary gears are used herein for the first and the second planetary gears 21 and 22. This can reduce drag loss between rotating elements in the first and the second planetary gears 21 and 22 to further improve the power transfer efficiency of the automatic transmission 20 in comparison with a case in which a double-pinion type planetary gear is used for at least either one of the first and the second planetary gears 21 and 22. Furthermore, it is possible to facilitate assembly and prevent the weight of the entire apparatus from increasing with a reduced number of components. As in the automatic transmission 20, using the Ravigneaux type planetary gear mechanism 25 that is a compound planetary gear train structured with a combination of the third planetary gear of the double-pinion type and the fourth planetary gear of the single-pinion type can facilitate assembly and prevent the weight of the entire apparatus from increasing with a reduced number of components.

The following describes a specific structure of the automatic transmission 20 in detail.

Figure 4:
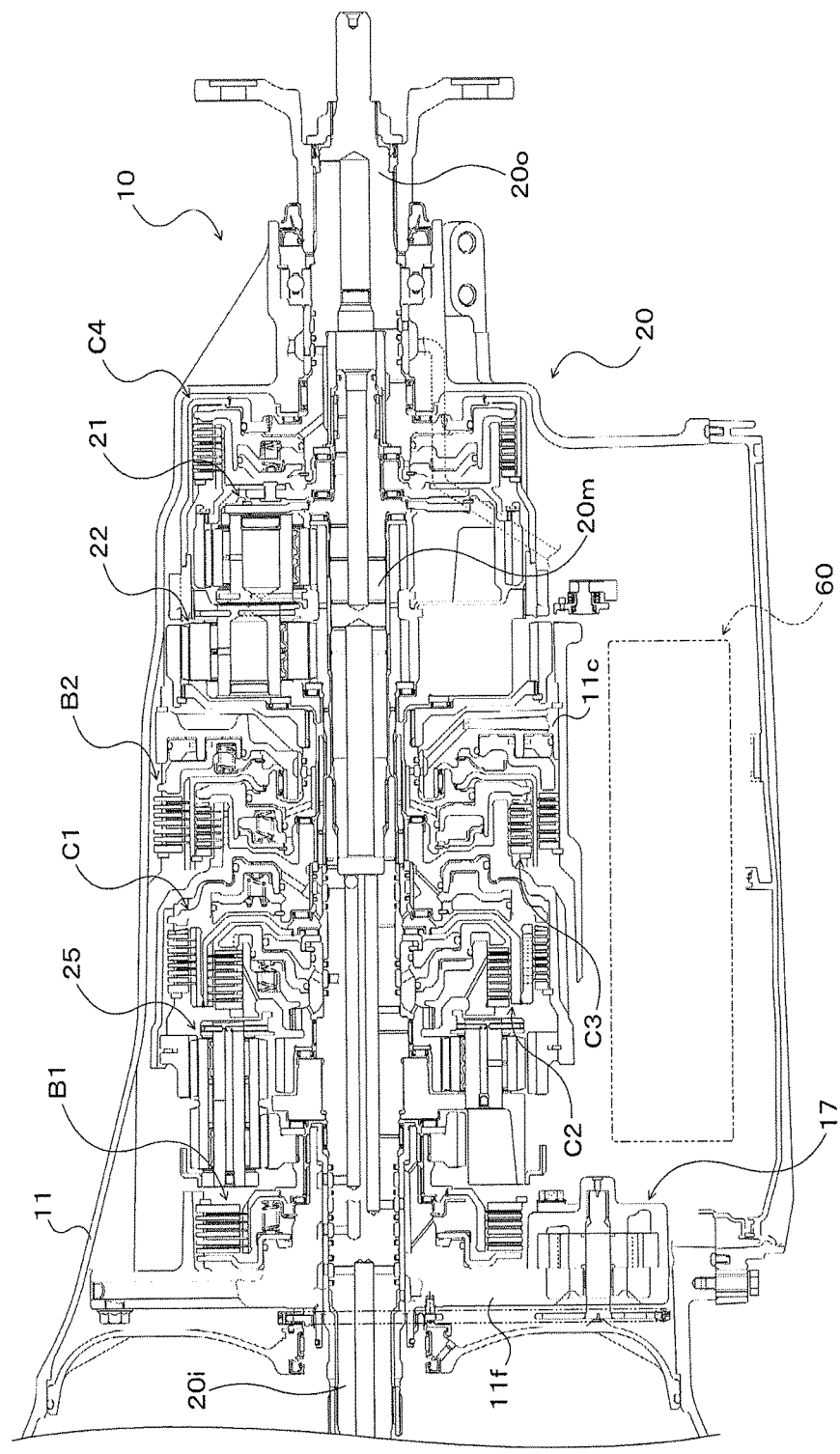
FIG. 4 is a sectional view illustrating the multi-stage transmission according to a preferred embodiment.
Figure 5:
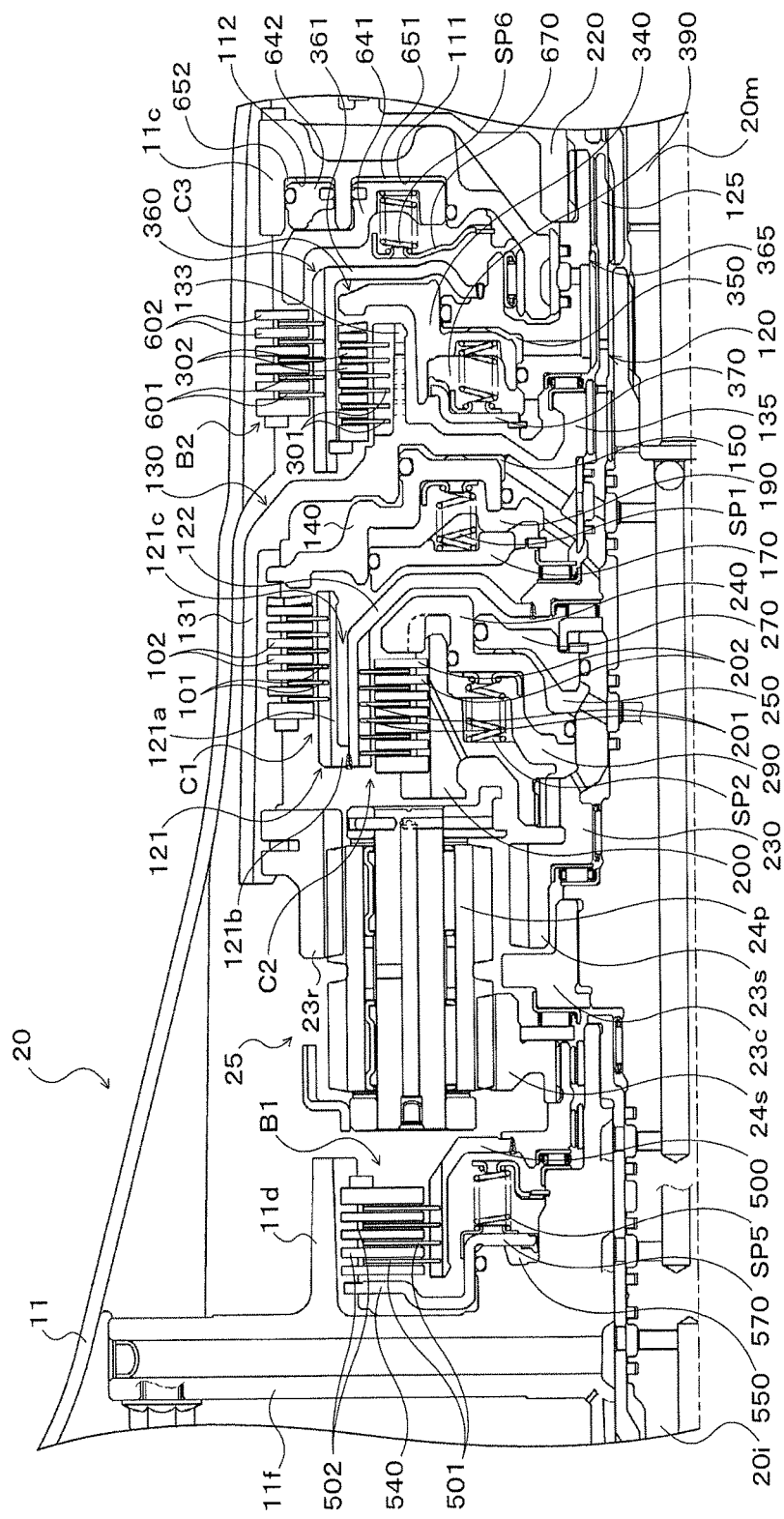
FIG. 5 is an enlarged sectional view illustrating the multi-stage transmission according to a preferred embodiment.
Figure 6:
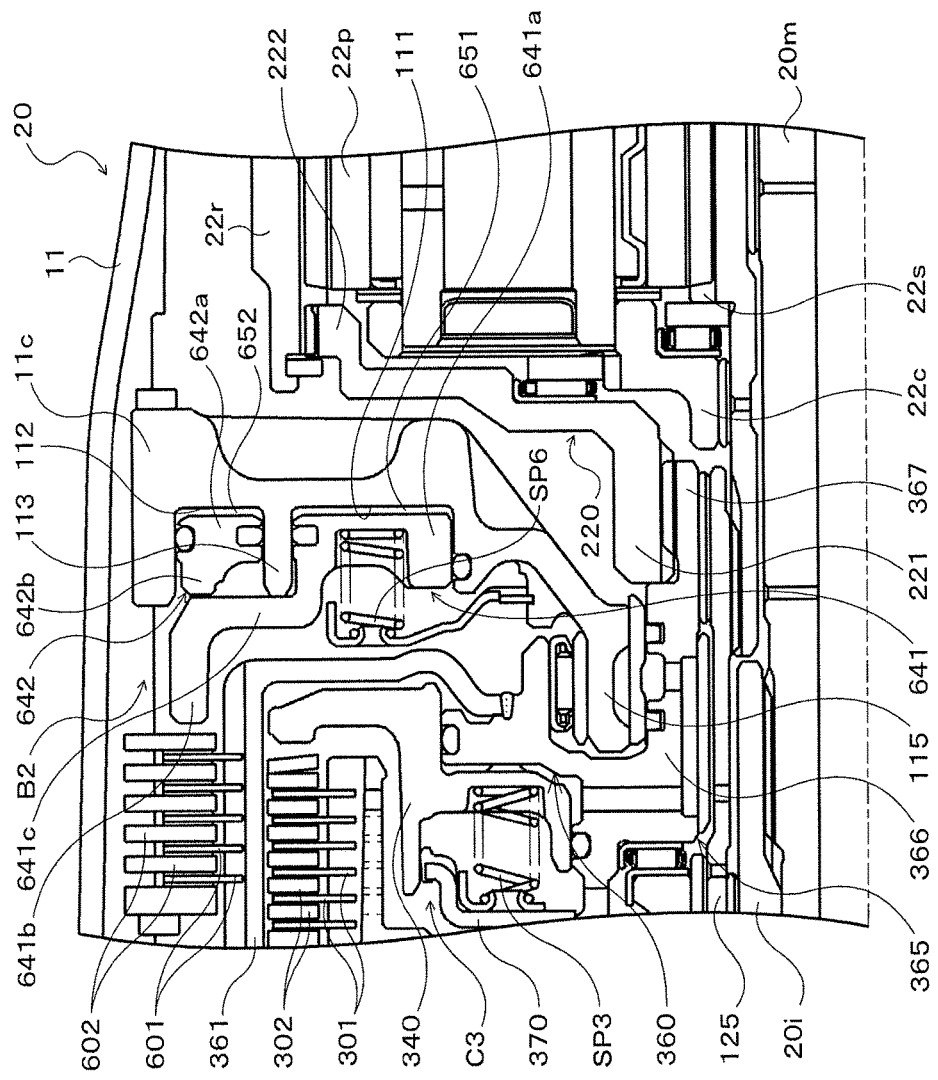
FIG. 6 is an enlarged sectional view illustrating the multi-stage transmission according to a preferred embodiment.
Figure 7:
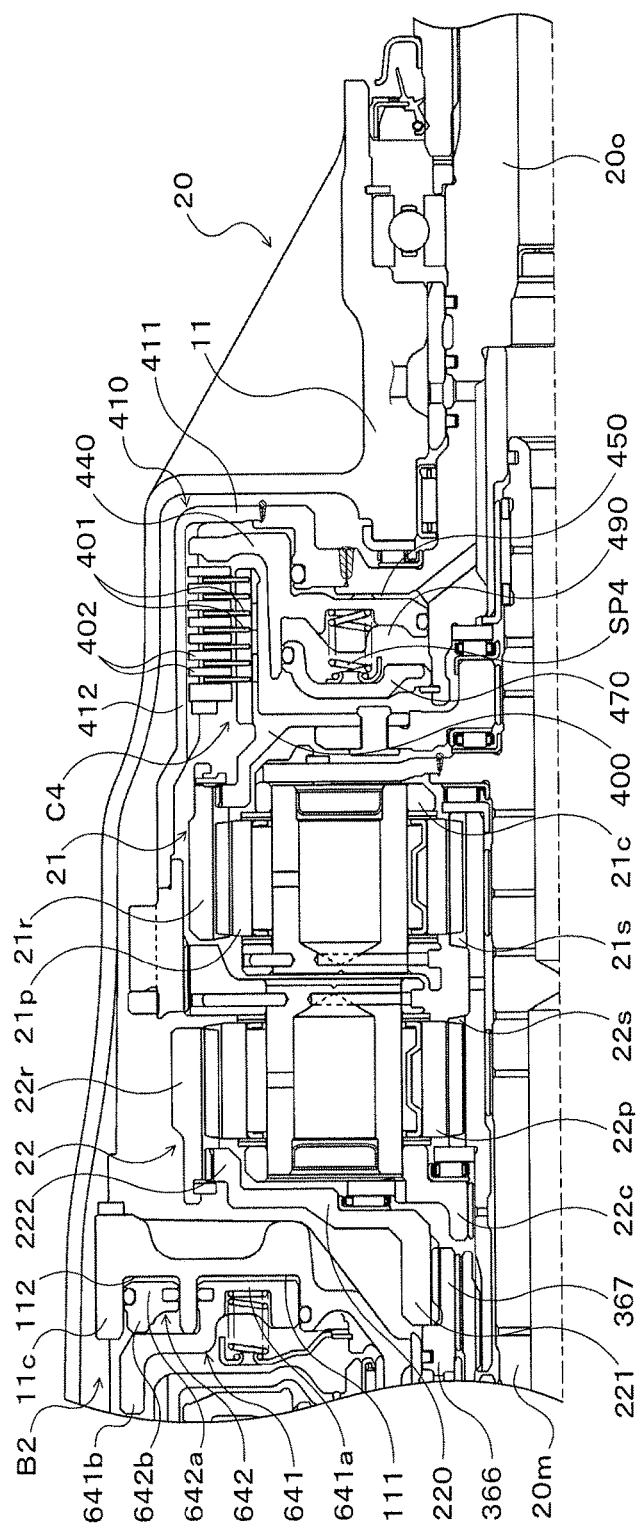
FIG. 7 is an enlarged sectional view illustrating the multi-stage transmission according to a preferred embodiment.

FIG. 4 is a sectional view illustrating the automatic transmission 20, and FIG. 5 to FIG. 7 are enlarged sectional views illustrating the automatic transmission 20. As depicted in FIG. 1 and FIG. 4, the brake B1 that holds (connects) the fourth sun gear 24s serving as a fixable element of the Ravigneaux type planetary gear mechanism 25 stationary with respect to the transmission case 11 is disposed closest to the starting device 12 (engine) among the four clutches C1 to C4 and the two brakes B1 and B2. Specifically, the brake B1 is disposed on the opposite side of the Ravigneaux type planetary gear mechanism 25 from the first and the second planetary gears 21 and 22, i.e., anteriorly to the Ravigneaux type planetary gear mechanism 25 in the vehicle (on the left side in FIG. 1).

As depicted in FIG. 4 and FIG. 5, the brake B1 includes: a brake hub 500 continuously coupled (fixed) to the fourth sun gear 24s; a plurality of friction plates 501; a plurality of separator plates 502 arranged alternately with the friction plates 501, and a backing plate; a piston 540 that presses the friction plates 501 and the separator plates 502 to cause these plates to frictionally engage with each other; and a plurality of return springs (coil springs) SP5 that bias the piston 540 so that the piston 540 moves away from the friction plates 501 and the separator plates 502.

The friction plates 501 (the respective inner peripheral portions thereof) of the brake B1 are fitted into splines formed on an outer peripheral surface of the brake hub 500. Accordingly, the respective friction plates 501 are supported by the brake hub 500 so as to rotate integrally with the brake hub 500 and be axially movable. The separator plates 502 (the respective outer peripheral portions thereof) of the brake B1 are fitted into splines formed on an inner peripheral surface of a drum portion 11d extending in the axial direction of the input shaft 20i from an annular front support (front support portion) 11f that is fixed to the transmission case 11 and constitutes part of the transmission case 11 (stationary member). Accordingly, the separator plates 502 are supported by the front support 11f so as not to be rotatable with respect to the transmission case 11 and so as to be axially movable. The piston 540 is supported by the front support 11f so as not to be rotatable with respect to the transmission case 11 and so as to be axially movable, and together with the front support 11f defines an engagement oil chamber 550 of the brake B1.

To the engagement oil chamber 550 of the brake B1, engagement oil pressure (hydraulic oil) to the brake B1, which is adjusted by the hydraulic control apparatus 60, is supplied through oil passages formed in the input shaft 20*i* and the front support 11*f*. The return springs SP5 are arranged at intervals in the circumferential direction between the piston 540 and an annular spring support member 570, and are opposed to the engagement oil chamber 550. The spring support member 570 is fixed to the front support 11*f* by a snap ring so as to be positioned on the opposite side of the piston 540 from the engagement oil chamber 550. As the return springs SP5 of the brake B1, a single leaf spring may be used instead of the coil springs.

As depicted in FIG. 1 and FIG. 4, the clutch C1 is disposed between the second planetary gear 22 and the Ravigneaux type planetary gear mechanism 25 so as to be positioned close to the Ravigneaux type planetary gear mechanism 25 (third planetary gear). The clutch C2 is disposed between the second planetary gear 22 and the Ravigneaux type planetary gear mechanism 25 so as to be surrounded by constituent members of the clutch C1 at least partially and be positioned close to the Ravigneaux type planetary gear mechanism 25 (third planetary gear). Furthermore, the clutch C3 is disposed between the second planetary gear 22 and the Ravigneaux type planetary gear mechanism 25 so as to be positioned close to the second planetary gear 22. The brake B2 is disposed between the second planetary gear 22 and the Ravigneaux type planetary gear mechanism 25 so as to surround the clutch C3 at least partially and be positioned close to the second planetary gear 22.

As described above, for the clutches C1 and C2, the first sun gear 21*s* of the first planetary gear 21 and the second sun gear 22*s* of the second planetary gear 22 are common elements to be connected. Accordingly, as depicted in FIG. 5, the clutches C1 and C2 share a drum member 120 that is continuously coupled (fixed) to the first sun gear 21*s* and the second sun gear 22*s* of the second planetary gear 22 and functions as a clutch hub of the clutch C1 and a clutch drum of the clutch C2. As described above, for the clutches C1 and C3, the third ring gear 23*r* of the Ravigneaux type planetary gear mechanism 25 is a common element to be connected. Accordingly, the clutches C1 and C3 share a drum member 130 that is continuously coupled (fixed) to the third ring gear 23*r* and functions as a clutch drum of the clutch C1 and a clutch hub of the clutch C3. Furthermore, as described above, for the clutch C3 and the brake B2, the second ring gear 22*r* of the second planetary gear 22 is an element to be connected or an element to be held stationary. Accordingly, the clutch C3 and the brake B2 share a drum member 360 that functions as a clutch drum of the clutch C3 and a brake hub of the brake B2.

The drum member 120 has a hub portion 121 used by the clutch C1, a drum portion 122 used by the clutch C2, and a coupling portion 125 that is continuously coupled (fixed) to the first sun gear 21*s* of the first planetary gear 21 and the second sun gear 22*s* of the second planetary gear 22 as the elements to be connected by the clutches C1 and the C2. The hub portion 121 has a tubular portion 121*a* including splines formed on the outer peripheral surface thereof and an annular flange portion 121*b* extending radially inward from one end (left end in FIG. 5) of the tubular portion 121*a*. In the present embodiment, the inner peripheral surface of the tubular portion 121*a* is formed in a shape of a cylindrical surface without protrusions or indentations. This can secure the strength of the hub portion 121 without increasing the thickness of the tubular portion 121*a*. Herein, the length of the flange portion 121*b* in the radial direction is optionally determined based on the torque capacity required of the clutches C1 and C2.

The drum portion 122 is formed in a shape of a bottomed cylinder one end of which (left end in FIG. 5) is open, and has a cylindrical portion and an annular sidewall portion extending radially inward from one end (on the right side in FIG. 5) of the cylindrical portion. On the inner peripheral surface of the drum portion 122 (cylindrical portion), splines are formed, and the outer peripheral surface of the drum portion 122 (cylindrical portion) is formed in a shape of a cylinder without protrusions or indentations. This can secure the strength of the drum portion 122 without increasing the thickness thereof. The coupling portion 125 has a long tubular portion and a flange portion extending radially outward from one end (left end in FIG. 5) of the tubular portion, and is coaxially and rotatably supported by the input shaft 20*i* via a bushing or a radial bearing, for example. The tubular portion (the other end thereof) of the coupling portion 125 is coupled to the first and the second sun gears 21*s* and 22*s* via splines, for example, and the flange portion of the coupling portion 125 is firmly fixed to the inner peripheral portion of the drum portion 122 by welding, for example. Consequently, the drum portion 122 is continuously coupled to the first and the second sun gears 21*s* and 22*s* via the coupling portion 125.

As depicted in FIG. 5, the open-side end of the drum portion 122 is press-fitted into the flange portion 121*b* (opening) of the hub portion 121, and the outer peripheral surface of the open-side end of the drum portion 122 and the inner peripheral surface of the flange portion 121*b* are firmly fixed by welding. Consequently, the hub portion 121 is continuously coupled to the first and the second sun gears 21*s* and 22*s* via the drum portion 122 and the coupling portion 125. The flange portion 121*b* thus fixed to the outer periphery of the open-side end of the drum portion 122 functions as an annular rib. The inner peripheral surface of the tubular portion 121*a* of the hub portion 121 faces the outer peripheral surface of the drum portion 122 with a gap interposed therebetween that depends on the radial dimension of the flange portion 121*b*. Between the tubular portion 121*a* of the hub portion 121 and the drum portion 122, an annular space 121*c* (oil pocket) is defined that is open on the side opposite to the open-side end of the drum portion 122 and the flange portion 121*b*.

The drum member 130 has a drum portion 131 used by the clutch C1, a hub portion 133 used by the clutch C3, and an annular support portion 135. In the present embodiment, the drum portion 131, the hub portion 133, and the support portion 135 are integrally formed by casting an aluminum alloy, for example. The drum portion 131 has a cylindrical portion including an open-side end (left end in FIG. 5) that is continuously coupled (fixed) to the third ring gear 23*r* of the Ravigneaux type planetary gear mechanism 25 as the element to be connected by the clutches C1 and C3, and an annular sidewall portion extending radially inward from one end (right end in FIG. 5) of the cylindrical portion. On the inner peripheral surface of the drum portion 131 (cylindrical portion), splines are formed, and the outer peripheral surface of the drum portion 131 (cylindrical portion) is formed in a shape of a cylindrical surface without protrusions or indentations. This can secure the strength of the drum portion 131 without increasing the thickness thereof.

The hub portion 133 of the drum member 130 extends from the annular sidewall portion of the drum portion 131 toward the side (right side in FIG. 5) opposite to the open-side end of the drum portion 131 (cylindrical portion). In the present embodiment, the hub portion 133 is formed in a cylindrical shape having an outer diameter smaller than that of the drum portion 131. On the outer peripheral surface of the hub portion 133, splines are formed, and the inner peripheral surface of the hub portion 133 is formed in a shape of a recessed cylindrical surface without protrusions or indentations. This can secure the strength of the hub portion 133 without increasing the thickness thereof. In the present embodiment, the support portion 135 extends radially inward from the inner peripheral surface of the hub portion 133, and the inner peripheral portion thereof is coaxially and rotatably supported by (the outer peripheral surface of) the coupling portion 125 of the drum member 120 via a bushing or a radial bearing, for example. Furthermore, between the support portion 135 of the drum member 130 and the flange portion of the coupling portion 125 of the drum member 120, a thrust bearing is disposed.

The drum member 360 has a drum portion 361 that is formed in a shape of a bottomed cylinder one end of which (left end in FIG. 5) is open, and a coupling portion 365 that is continuously coupled (fixed) to a ring gear flange (coupling member) 220 that rotates integrally with the second ring gear 22r of the second planetary gear 22 as the element to be connected (element to be held stationary) by the clutch C3 and the brake B2. The drum portion 361 of the drum member 360 has a cylindrical portion and an annular sidewall portion extending radially inward from one end (right end in FIG. 5) of the cylindrical portion. On the inner peripheral surface and the outer peripheral surface of the drum portion 361 (cylindrical portion), splines are formed. To the inner peripheral portion of the drum portion 361 (annular sidewall portion), the outer peripheral portion of the coupling portion 365 is firmly fixed by welding, for example.

As depicted in FIG. 6, the coupling portion 365 of the drum member 360 is radially supported (aligned) by an annular center support (intermediate support portion) 11c that is fixed to the transmission case 11 so as to be positioned between the drum portion 361 (Ravigneaux type planetary gear mechanism 25) and the second planetary gear 22, and that constitutes part of the transmission case 11 (stationary member). As depicted in the drawing, the center support 11c extends radially inward from the inner peripheral surface of the transmission case 11, and includes an inner tubular portion 115 having a center hole. The coupling portion 365 of the drum member 360 is rotatably supported by the outer peripheral surface of the inner tubular portion 115 of the center support 11c via a needle bearing (radial bearing). This enables the drum member 360 to be accurately aligned with respect to the transmission case 11 by the outer peripheral surface (center support 11c) of the inner tubular portion 115. The coupling portion 365 has a tubular portion 366 extending in the axial direction of the automatic transmission 20 (the input shaft 20i and the output shaft 20o). The tubular portion 366 is inserted into the inner tubular portion 115 of the center support 11c via a bushing to be coupled to the second ring gear 22r.

A distal end portion 367 of the tubular portion 366 of the coupling portion 365 is formed so as to have an outer diameter smaller than that of an area surrounded by (the inner peripheral surface of) the inner tubular portion 115 of the center support 11c. On the outer peripheral surface of the distal end portion 367, splines are formed. Furthermore, the ring gear flange 220 has an inner peripheral portion 221 that is fitted (spline-fitted) into the splines of the distal end portion 367 of the coupling portion 365 and an outer peripheral portion 222 that is fitted (spline-fitted) into splines formed on the inner peripheral surface of the second ring gear 22r. Consequently, the drum member 360 (drum portion 361) is continuously coupled to the second ring gear 22r via two fitting portions (spline fitting portions) provided on the inner peripheral side and the outer peripheral side of the ring gear flange 220.

In the present embodiment, at least either one of the fitting portion between the inner peripheral portion 221 of the ring gear flange 220 and the distal end portion 367 of the drum member 360 and the fitting portion between the outer peripheral portion 222 of the ring gear flange 220 and the second ring gear 22r is structured as a fitting portion that does not have an aligning function. This fitting portion without an aligning function has radial play (gap, or clearance, between each bottom land of the splines of the inner peripheral portion 221 or the outer peripheral portion 222 and the corresponding top land of the splines of the distal end portion 367 or the second ring gear 22r) that is larger than a backlash between adjacent spline teeth in the circumferential direction. As described above, the distal end portion 367 of the tubular portion 366 of the drum member 360 has an outer diameter smaller than that of an area supported by the inner peripheral surface of the center support 11c. Thus, the distal end portion 367 of the tubular portion 366 is fitted into the inner peripheral portion 221 of the ring gear flange 220 at an inner position (position closer to the intermediate shaft 20m) than a position, supported by the center support 11c, of the coupling portion 365 (tubular portion 366).

The clutch C1 including the drum members 120 and 130 as constituent members includes: a plurality of friction plates (friction engagement plates) 101; a plurality of separator plates (friction engagement plates) 102 arranged alternately with the friction plates 101, and a backing plate; a piston 140 that presses the friction plates 101 and the separator plates 102 to cause these plates to frictionally engage with each other; a plurality of return springs (coil springs) SP1 that bias the piston 140 so that the piston 140 moves away from the friction plates 101 and the separators plates 102; and an annular cancel plate (cancel oil-chamber defining member) 170, in addition to the drum members 120 and 130.

The friction plates 101 (the respective inner peripheral portions thereof) of the clutch C1 are fitted into splines formed on the outer peripheral surface of the hub portion 121 of the drum member 120, i.e., the tubular portion 121a, that is disposed so as to be surrounded by the drum portion 131 of the drum member 130. Accordingly, the friction plates 101 are supported by the drum member 120 that functions as a clutch hub so as to rotate integrally with the hub portion 121 and be axially movable. The separator plates 102 (the respective outer peripheral portions) of the clutch C1 are fitted into splines formed on the inner peripheral surface of the drum portion 131 of the drum member 130. Accordingly, the separator plates 102 are supported by the drum member 130 that functions as a clutch drum so as to rotate integrally with the drum portion 131 and be axially movable.

The piston 140 is disposed between the drum portion 131 of the drum member 130 and the drum portion 122 of the drum member 120, and is supported by the support portion 135 of the drum member 130 so as to rotate integrally with the drum member 130 and be axially movable. The cancel plate 170 is disposed between the piston 140 and the drum portion 122 of the drum member 120, i.e., on the opposite side of the piston 140 from the support portion 135 of the drum member 130, and is fixed to the support portion 135 with a snap ring. The piston 140, together with the support portion 135 of the drum member 130, defines an engagement oil chamber (first engagement oil chamber) 150 of the clutch C1. Furthermore, the cancel plate 170, together with the piston 140 and the support portion 135, defines a centrifugal oil pressure cancel chamber (first centrifugal oil pressure cancel chamber) 190 for canceling centrifugal oil pressure generated in the engagement oil chamber 150.

Consequently, all oil chambers of the clutch C1, i.e., the engagement oil chamber 150 and the centrifugal oil pressure cancel chamber 190 are defined by the drum member 130 (support portion 135), the piston 140, and the cancel plate 170 that rotate integrally with the third ring gear 23r (first output element) of the Ravigneaux type planetary gear mechanism 25. In the present embodiment, as depicted in FIG. 4 and FIG. 5, the engagement oil chamber 150 and the centrifugal oil pressure cancel chamber 190 of the clutch C1 are defined so as to be more remote from the Ravigneaux type planetary gear mechanism 25 and be positioned closer to the second planetary gear 22 than the hub portion 121 and the drum portion 122 of the drum member 120 are.

To the engagement oil chamber 150 of the clutch C1, engagement oil pressure (hydraulic oil) to the clutch C1, which is adjusted by the hydraulic control apparatus 60, is supplied through oil passages formed in the input shaft 20i, the coupling portion 125 of the drum member 120, and the support portion 135 of the drum member 130, for example. To the centrifugal oil pressure cancel chamber 190, hydraulic oil (e.g., drain oil for lubrication and cooling) from the hydraulic control apparatus 60 is supplied through oil passages formed in the input shaft 20i, the coupling portion 125 of the drum member 120, and the support portion 135 of the drum member 130, for example. The return springs SP1 are arranged at intervals in the circumferential direction inside the centrifugal oil pressure cancel chamber 190 so as to be positioned between the piston 140 and the cancel plate 170. As the return springs SP1 of the clutch C1, a single leaf spring may be used instead of the coil springs.

The clutch C2 including the drum member 120 as a constituent member includes: a clutch hub 200; a plurality of friction plates (first friction engagement plates) 201; a plurality of separator plates 202 (second friction engagement plates) arranged alternately with the friction plates 201, and a backing plate; a piston 240 that presses the friction plates 201 and the separator plates 202 to cause these plates to frictionally engage with each other; an annular oil-chamber defining member 270; and a plurality of return springs (coil springs) SP2 that bias the piston 240 so that the piston 240 moves away from the friction plates 201 and the separator plates 202, in addition to the drum member 120.

The clutch hub 200 has a tubular portion having splines formed on the outer peripheral surface thereof and an annular coupling portion extending radially inward from the tubular portion and continuously coupled (fixed) to a shaft portion 230 that extends in the axial direction from the third sun gear 23s of the Ravigneaux type planetary gear mechanism 25. The friction plates 201 (the respective outer peripheral portions) of the clutch C2 are fitted into splines formed on an inner peripheral surface of the drum portion 122 of the drum member 120 that is disposed so as to surround the clutch hub 200. Accordingly, the friction plates 201 are supported by the drum member 120 that functions as a clutch drum so as to rotate integrally with the drum portion 122 and be axially movable. The separator plates 202 (the respective inner peripheral portions) of the clutch C2 are fitted into the splines formed on the outer peripheral surface of the clutch hub 200 (tubular portion). Accordingly, the separator plates 202 are supported by the clutch hub 200 so as to rotate integrally with the clutch hub 200 and be axially movable.

The piston 240 is disposed so that the piston 240 is surrounded by the drum portion 122 of the drum member 120 and part of the piston 240 on the inner peripheral side protrudes inside the tubular portion of the clutch hub 200. The piston 240 is supported by the shaft portion 230 so as to rotate integrally with the shaft portion 230 of the third sun gear 23s and be axially movable. The oil-chamber defining member 270 is fixed to the shaft portion 230 with a snap ring so as to be positioned between the piston 240 and the drum member 120. In other words, the oil-chamber defining member 270 is positioned on the opposite side of the piston 240 (the inner peripheral portion thereof) from the coupling portion of the clutch hub 200 and the third sun gear 23s. The piston 240, together with the oil-chamber defining member 270 and the shaft portion 230, defines an engagement oil chamber (second engagement oil chamber) 250 of the clutch C2. Furthermore, the piston 240, together with the clutch hub 200 and the shaft portion 230, defines a centrifugal oil pressure cancel chamber (second centrifugal oil pressure cancel chamber) 290 for canceling centrifugal oil pressure generated in the engagement oil chamber 250.

Consequently, all oil chambers of the clutch C2, i.e., the engagement oil chamber 250 and the centrifugal oil pressure cancel chamber 290 are defined by the shaft portion 230, the piston 240, and the oil-chamber defining member 270 that rotate integrally with the third sun gear 23s (second output element) of the Ravigneaux type planetary gear mechanism 25. In the present embodiment, as depicted in FIG. 4 and FIG. 5, the engagement oil chamber 250 and the centrifugal oil pressure cancel chamber 290 of the clutch C2 are defined so as to be positioned closer to the Ravigneaux type planetary gear mechanism 25 than the cancel plate 170 of the clutch C1, i.e., the engagement oil chamber 150 and the centrifugal oil pressure cancel chamber 190 of the clutch C1 are. Furthermore, the engagement oil chamber 250 and the centrifugal oil pressure cancel chamber 290 are more remote from the second planetary gear 22 and are positioned closer to the input shaft 20i.

To the engagement oil chamber 250 of the clutch C2, engagement oil pressure (hydraulic oil) to the clutch C2, which is adjusted by the hydraulic control apparatus 60, is supplied through oil passages formed in the input shaft 20i and the shaft portion 230 of the third sun gear 23s, for example. To the centrifugal oil pressure cancel chamber 290, hydraulic oil (e.g., drain oil for lubrication and cooling) from the hydraulic control apparatus 60 is supplied through oil passages formed in the input shaft 20i and the shaft portion 230 of the third sun gear 23s, for example. The return springs SP2 are arranged at intervals in the circumferential direction inside the centrifugal oil pressure cancel chamber 290 so as to be positioned between the piston 240 and the clutch hub 200 (coupling portion). As the return springs SP2 of the clutch C2, a single leaf spring may be used instead of the coil springs. Furthermore, in the present embodiment, the shaft portion 230 of the third sun gear 23s and the clutch hub 200 as hub members are coaxially and rotatably supported by the input shaft 20i via a bushing or a radial bearing, and are axially supported by the third carrier 23c of the Ravigneaux type planetary gear mechanism 25 and the coupling portion 125 of the drum member 120 via a thrust bearing.

The clutch C3 including the drum members 130 and 360 as constituent members includes: a plurality of friction plates 301; a plurality of separator plates 302 arranged alternately with the friction plates 301, and a backing plate; a piston 340 that presses the friction plates 301 and the separator plates 302 to cause these plates to frictionally engage with each other; a plurality of return springs (coil springs) SP3 that bias the piston 340 so that the piston 340 moves away from the friction plates 301 and the separator plates 302; and an annular cancel plate (cancel oil-chamber defining member) 370, in addition to the drum members 130 and 360.

The friction plates 301 (the respective inner peripheral portions thereof) of the clutch C3 are fitted into the splines formed on the outer peripheral surface of the hub portion 133 of the drum member 130 extending toward the second planetary gear 22 side, i.e., rearward in the vehicle. Accordingly, the friction plates 301 are supported by the drum member 130 that functions as a clutch hub so as to rotate integrally with the hub portion 133 and be axially movable. The separator plates 302 (the respective outer peripheral portions thereof) of the clutch C3 are fitted into the splines formed on the inner peripheral surface of the drum portion 361 of the drum member 360 that is disposed so as to surround the hub portion 133 of the drum member 130. Accordingly, the separator plates 302 are supported by the drum member 360 that functions as a clutch drum so as to rotate integrally with the drum portion 361 and be axially movable.

The piston 340 is disposed between the drum member 130 and the drum portion 361 of the drum member 360, and is supported by the coupling portion 365 of the drum member 360 so as to rotate integrally with the drum member 360 and be axially movable. The cancel plate 370 is disposed between the piston 340 and the drum member 130, i.e., on the opposite side of the piston 340 from the coupling portion 365 of the drum member 360, and is fixed to the coupling portion 365 with a snap ring. The piston 340 together with the drum member 360 defines an engagement oil chamber (third engagement oil chamber) 350 of the clutch C3. Furthermore, the cancel plate 370 together with the piston 340 defines a centrifugal oil pressure cancel chamber (third centrifugal oil pressure cancel chamber) 390 for canceling centrifugal oil pressure generated in the engagement oil chamber 350.

Consequently, all oil chambers of the clutch C3, i.e., the engagement oil chamber 350 and the centrifugal oil pressure cancel chamber 390 are defined by the drum member 360, the piston 340, and the cancel plate 370 that rotate integrally with the second ring gear 22r of the second planetary gear 22. In the present embodiment, as depicted in FIG. 5, the engagement oil chamber 350 and the centrifugal oil pressure cancel chamber 390 of the clutch C3 are defined so as to be more remote from the Ravigneaux type planetary gear mechanism 25 and be positioned closer to the second planetary gear 22 than the support portion 135 of the drum member 130, i.e., the engagement oil chamber 150 and the centrifugal oil pressure cancel chamber 190 of the clutch C1 are.

To the engagement oil chamber 350 of the clutch C3, engagement oil pressure (hydraulic oil) to the clutch C3, which is adjusted by the hydraulic control apparatus 60, is supplied through oil passages formed in the center support 11c and the coupling portion 365 of the drum member 360, for example. By supplying the hydraulic oil to the engagement oil chamber 350 of the clutch C3 through oil passages formed in the center support 11c in this manner, the oil passage structure in the automatic transmission 20 can be prevented from becoming complicated. To the centrifugal oil pressure cancel chamber 390, hydraulic oil (e.g., drain oil for lubrication and cooling) from the hydraulic control apparatus 60 is supplied through oil passages formed in the intermediate shaft 20m, the coupling portion 125 of the drum member 120, and the coupling portion 365 of the drum member 360, for example. The return springs SP3 are arranged at intervals in the circumferential direction inside the centrifugal oil pressure cancel chamber 390 so as to be positioned between the piston 340 and the cancel plate 370. As the return springs SP3 of the clutch C3, a single leaf spring may be used instead of the coil springs.

As depicted in FIG. 6, the brake B2 including the drum member 360 as a constituent member includes: a plurality of friction plates (friction engagement plates) 601; a plurality of separator plates (friction engagement plates) 602 arranged alternately with the friction plates 601, and a backing plate; a first piston 641 that presses the friction plates 601 and the separator plates 602 to cause these plates to frictionally engage with each other; a second piston 642 that can press the first piston 641; and a plurality of return springs (coil springs) SP6 that bias the first piston 641 so that the first piston 641 moves away from the friction plates 601 and the separator plates 602.

The friction plates 601 (the respective inner peripheral portions thereof) of the brake B2 are fitted into the splines formed on the outer peripheral surface of the drum portion 361 of the drum member 360. The respective friction plates 601 are supported by the drum member 360 that functions as a brake hub so as to rotate integrally with the drum portion 361 and be axially movable. The separator plates 602 (the respective outer peripheral portions thereof) of the brake B2 are fitted into splines formed on an inner peripheral surface of the transmission case 11. The respective separator plates 602 are supported by the transmission case 11 so as not to be rotatable with respect to the transmission case 11 and so as to be axially movable. As depicted in FIG. 4 to FIG. 6, the friction plates 601 and the separator plates 602 of the brake B2 are disposed on the opposite side of the center support 11c from the second planetary gear 22, i.e., closer to the Ravigneaux type planetary gear mechanism 25 than the center support 11c is.

As depicted in FIG. 5 to FIG. 7, the center support 11c has an annular first recessed portion 111 that is open toward the side opposite to the second planetary gear 22, i.e., the Ravigneaux type planetary gear mechanism 25 side (left in the drawing) and an annular second recessed portion 112 that is open toward the side opposite to the second planetary gear 22 in the same manner. The first recessed portion 111 is formed radially inward of the second recessed portion 112, and is surrounded by the second recessed portion 112. In other words, the first recessed portion 111 is, radially inward of the second recessed portion 112, aligned with the second recessed portion 112 in the radial direction of the center support 11c (transmission case 11). The first and the second recessed portions 111 and 112 are separated by an annular partition 113 (see FIG. 6) so as not to communicate with each other, and are formed so as to have substantially the same axial length in the present embodiment.

The first piston 641 has an annular first pressure-receiving portion 641a, a tubular plate-pressing portion 641b that presses the friction plates 601 and the separator plates 602, and an annular portion 641c having a shape of a flat plate (shape of a flange) extending in the radial direction of the center support 11c, i.e., the transmission case 11, between the first pressure-receiving portion 641a and the plate-pressing portion 641b. The first pressure-receiving portion 641a is formed in a shape of a short cylinder. The annular portion 641c is axially offset from the first pressure-receiving portion 641a and extends radially outward from the first pressure-receiving portion 641a. The plate-pressing portion 641b axially extends from the outer peripheral portion of the annular portion 641c toward the side opposite to the first pressure-receiving portion 641a, and is formed in a cylindrical shape, for example, in the present embodiment. As depicted in FIG. 6, the first pressure-receiving portion 641a is movably fitted into the first recessed portion 111. Between the inner peripheral surface of the first pressure-receiving portion 641a and the inside inner surface of the first recessed portion 111, and between the outer peripheral surface of the first pressure-receiving portion 641a and the outside inner surface of the first recessed portion 111, seal members such as O-rings are disposed one by one. Accordingly, the first pressure-receiving portion 641a is supported by the center support 11c so as to be axially movable, and together with the center support 11c defines a first engagement oil chamber 651 of the brake B1. Furthermore, the plate-pressing portion 641b is fitted into splines on the transmission case 11, and protrudes toward the Ravigneaux type planetary gear mechanism 25 (toward the side opposite to the second planetary gear 22) so as to be capable of coming into contact with the separator plate 602 that is positioned closest to the second planetary gear 22. Herein, the plate-pressing portion 641b may extend from the annular portion 641c so as to be aligned at intervals in the circumferential direction of the first piston 641. This enables the weight of the first piston 641 to be reduced.

The second piston 642 has an annular second pressure-receiving portion 642a and an annular piston-pressing portion 642b. The second pressure-receiving portion 642a is movably fitted into the second recessed portion 112. Between the inner peripheral surface of the second pressure-receiving portion 642a and the inside inner surface of the second recessed portion 112, and between the outer peripheral surface of the second pressure-receiving portion 642a and the outside inner surface of the second recessed portion 112, seal members such as O-rings are disposed one by one. Accordingly, the second pressure-receiving portion 642a is supported by the center support 11c so as to be axially movable, and together with the center support 11c defines a second engagement oil chamber 652 of the brake B2. The piston-pressing portion 642b extends from the second pressure-receiving portion 642a toward the Ravigneaux type planetary gear mechanism 25 (toward the side opposite to the second planetary gear 22) so as to be capable of coming into contact with the back surface of the annular portion 641c of the first piston 641. In the present embodiment, the piston-pressing portion 642b of the second piston 642 overlaps substantially the whole of the plate-pressing portion 641b of the first piston 641 when viewed from the axial direction of the input shaft 20i and the output shaft 20o, for example. This enables the annular portion 641c of the first piston 641 to be pressed by the piston-pressing portion 642b from behind the plate-pressing portion 641b. A plurality of the piston-pressing portion 642b may be formed such that the pistons are aligned at intervals in the circumferential direction of the second pressure-receiving portion 642a.

To the first and the second engagement oil chambers 651 and 652 of the brake B2, engagement oil pressure (hydraulic oil), which is adjusted by the hydraulic control apparatus 60, is supplied independently through oil passages formed in the center support 11c. The return springs SP6 are arranged at intervals in the circumferential direction between the first piston 641 and an annular spring support member 670, and are opposed to the first engagement oil chamber 651. The spring support member 670 is fixed to the center support 11c with a snap ring so as to be positioned on the opposite side of the first piston 641 from the first engagement oil chamber 651. On the first pressure-receiving portion 641a of the first piston 641, a plurality of holes are formed at intervals in the circumferential direction so as to be positioned on the side opposite to the first engagement oil chamber 651, and one end of each return spring SP6 is inserted into the corresponding hole. Accordingly, the respective return springs SP6 are opposed to the first engagement oil chamber 651, and also are disposed so as to press the first pressure-receiving portion 641a of the first piston 641. The respective return springs SP6 partially overlap the second recessed portion 112 of the center support 11c when viewed from the radial direction. As the return springs SP6 of the brake B2, a single leaf spring may be used instead of the coil springs.

As depicted in FIG. 4 and FIG. 7, the clutch C4 is disposed closest to the output shaft 20o among the four clutches C1 to C4 and the two brakes B1 and B2. Specifically, the clutch C4 is disposed on the opposite side of the second planetary gear 22 from the Ravigneaux type planetary gear mechanism 25, i.e., posteriorly to the first planetary gear 21 in the vehicle (right side in FIG. 1). As depicted in FIG. 7, the clutch C4 includes: a clutch hub 400; a clutch drum 410; a plurality of friction plates 401; a plurality of separator plates 402 arranged alternately with the friction plates 401, and a backing plate; a piston 440 that presses the friction plates 401 and the separator plates 402 to cause these plates to frictionally engage with each other; a plurality of return springs (coil springs) SP4 that bias the piston 440 so that the piston 440 moves away from the friction plates 401 and the separator plates 402; and an annular cancel plate (cancel oil-chamber defining member) 470.

The clutch hub 400 is rotatably supported by the intermediate shaft 20m via a bushing or a radial bearing, and is axially supported by a flange portion formed on the intermediate shaft 20m and the output shaft 20o via two thrust bearings that are longitudinally disposed. The clutch hub 400 is continuously coupled (fixed) to the first ring gear 21r of the first planetary gear 21 via splines and a snap ring. The clutch drum 410 includes: an annular sidewall portion 411 that is fixed to an increased-diameter portion formed on the output shaft 20o by welding, for example; and a cylindrical portion 412 that is formed in a shape of a bottomed cylinder one end of which (left end in FIG. 7) is open, and is joined to the outer peripheral portion of the annular sidewall portion 411 by welding, for example, and that extends along the axial direction of the output shaft 20o, for example. The open-side end (left end in FIG. 7) of the cylindrical portion 412 is continuously coupled (fixed) to the second carrier 22c of the second planetary gear 22 via splines, for example.

The friction plates 401 (the respective inner peripheral portions thereof) of the clutch C4 are fitted into splines formed on an outer peripheral surface of the clutch hub 400. Accordingly, the friction plates 401 are supported by the clutch hub 400 so as to rotate integrally with the clutch hub 400 and be axially movable. The separator plates 402 (the respective outer peripheral portions thereof) of the clutch C4 are fitted into splines formed on an inner peripheral surface of the cylindrical portion 412 of the clutch drum 410. Accordingly, the separator plates 402 are supported by the clutch drum 410 so as to rotate integrally with the clutch drum 410 and be axially movable.

The piston 440 is disposed, inside the cylindrical portion 412 of the clutch drum 410, closer to the first planetary gear 21 (more anteriorly in the vehicle) than the annular sidewall portion 411 is, and is supported by the output shaft 20o so as to rotate integrally with the output shaft 20o and be axially movable. The cancel plate 470 is fixed to the output shaft 20o with a snap ring so as to be positioned closer to the first planetary gear 21 (more anteriorly in the vehicle) than the piston 440 is. The piston 440, together with the clutch drum 410 and the output shaft 20o as oil-chamber defining portions, defines an engagement oil chamber (fourth engagement oil chamber) 450 of the clutch C4. Furthermore, the cancel plate 470 together with the piston 440 and the output shaft 20*o* defines a centrifugal oil pressure cancel chamber (fourth centrifugal oil pressure cancel chamber) 490 for canceling centrifugal oil pressure generated in the engagement oil chamber 450. Consequently, all oil chambers of the clutch C4, i.e., the engagement oil chamber 450 and the centrifugal oil pressure cancel chamber 490 are defined by the clutch drum 410, the piston 440, and the cancel plate 470 that rotate integrally with the second carrier 22*c* of the second planetary gear 22 and the output shaft 20*o*.

To the engagement oil chamber 450 of the clutch C4, engagement oil pressure (hydraulic oil) to the clutch C4, which is adjusted by the hydraulic control apparatus 60, is supplied through oil passages formed in the transmission case 11 and the output shaft 20*o*, for example. To the centrifugal oil pressure cancel chamber 490, hydraulic oil (e.g., drain oil for lubrication and cooling) from the hydraulic control apparatus 60 is supplied through oil passages formed in the transmission case 11 and the output shaft 20*o*, for example. The return springs SP4 are arranged at intervals in the circumferential direction inside the centrifugal oil pressure cancel chamber 490 so as to be positioned between the piston 440 and the cancel plate 470. As the return springs SP4 of the clutch C4, a single leaf spring may be used instead of the coil springs. The output shaft 20*o* is rotatably supported by the transmission case 11 via a bushing, a radial bearing, and a thrust bearing.

In the automatic transmission 20 structured as described above, the clutch C2 corresponds to the third sun gear 23*s* (see FIG. 2) that rotates at a higher speed out of the third ring gear 23*r* (first output element) and the third sun gear 23*s* (second output element) of the Ravigneaux type planetary gear mechanism 25. The clutch C2 is disposed between the Ravigneaux type planetary gear mechanism 25 and the second planetary gear 22 that is disposed closer to the Ravigneaux type planetary gear mechanism 25 than the first planetary gear 21 is. Thus, the automatic transmission 20 eliminates the need for constituent members of the clutch C2 to be structured so as to detour around the first and the second planetary gears 21 and 22 each having a large diameter. Furthermore, the engagement oil chamber 250 and the centrifugal oil pressure cancel chamber 290 of the clutch C2 are defined so as to be positioned closer to the input shaft 20*i* than the engagement oil chamber 150 and the centrifugal oil pressure cancel chamber 190 of the clutch C1 are.

Consequently, increase in dimensions (outer diameter, axial length, thickness, etc.) or weight associated with securing the strength of constituent members of the clutch C2 such as the shaft portion 230, the piston 240, and the oil-chamber defining member 270 can be suppressed, whereby the automatic transmission 20 can be prevented from upsizing. The rotational inertia (equivalent inertia at the input shaft 20*i*) of the third sun gear 23*s* that rotates at a higher speed than the third ring gear 23*r*, and the shaft portion 230, the piston 240, and the oil-chamber defining member 270 that rotate integrally with the third sun gear 23*s* can be reduced, whereby the shifting performance can be improved. Furthermore, the clutch hub 200, the diameter of which can be reduced in contrast to the drum member 120 as a clutch drum, is coupled to the third sun gear 23*s*, whereby the rotational inertia of the members rotating integrally with the third sun gear 23*s* that rotates at a higher speed than the third ring gear 23*r* can be further reduced.

In the automatic transmission 20, the engagement oil chamber 150 and the centrifugal oil pressure cancel chamber 190 of the clutch C1 and the engagement oil chamber 350 and the centrifugal oil pressure cancel chamber 390 of the clutch C3 are disposed between the clutch C2 (the engagement oil chamber 250 and the centrifugal oil pressure cancel chamber 290) and the second planetary gear 22 that is disposed closer to the Ravigneaux type planetary gear mechanism 25 than the first planetary gear 21 is. Furthermore, the clutch C4 is disposed on the opposite side (posteriorly in the vehicle) of the second planetary gear 22, which is disposed closer to the Ravigneaux type planetary gear mechanism 25 than the first planetary gear 21 is, from the Ravigneaux type planetary gear mechanism 25. Accordingly, the clutch C2 corresponding to the third sun gear 23*s* rotating at a higher speed than the third ring gear 23*r* can be positioned closer to the Ravigneaux type planetary gear mechanism 25. Thus, the axial length of constituent members of the clutch C2 such as the shaft portion 230, the piston 240, and the oil-chamber defining member 270 that rotate integrally with the third sun gear 23*s* can be shortened, so that the weight of these members can be reduced. Consequently, the rotational inertia of the shaft portion 230, the piston 240, and the oil-chamber defining member 270, for example, can be reduced to further improve the shifting performance, and the axial length of the automatic transmission 20 can be prevented from increasing.

Furthermore, in the automatic transmission 20, the clutch C1 (drum portion 131, etc.) corresponding to the third ring gear 23*r* (first output element) of the Ravigneaux type planetary gear mechanism 25 is disposed so as to surround the substantially entire clutch C2, i.e., the drum portion 122 of the drum member 120, the clutch hub 200, the friction plates 201, the separator plates 202, and the oil-chamber defining member 270, for example. This enables the axial length of the automatic transmission 20 to be more satisfactorily prevented from increasing. In the automatic transmission 20, the brake B1 is disposed on the opposite side (anteriorly in the vehicle) of the Ravigneaux type planetary gear mechanism 25 from the first and the second planetary gears 21 and 22. Furthermore, the brake B2 (the drum portion 361 of the drum member 360, the friction plates 601, the separator plates 602, etc.) is disposed, between the clutch C2 and the second planetary gear 22 that is disposed closer to the Ravigneaux type planetary gear mechanism 25 than the first planetary gear 21 is, so as to surround part of the clutch C3, i.e., the hub portion 133, the friction plates 301, the separator plates 302, and the oil-chamber defining member 270, for example. This makes it possible to prevent the axial length of the automatic transmission 20 from increasing and to sufficiently secure arrangement space for the clutches C1, C2, and C3 between the Ravigneaux type planetary gear mechanism 25 and the second planetary gear 22 that is disposed closer to the Ravigneaux type planetary gear mechanism 25 than the first planetary gear 21 is.

The following describes operation of the automatic transmission 20.

In the automatic transmission 20, when the second to the sixth and the eighth to the tenth forward speeds are formed, the brake B1 is engaged, whereby the fourth sun gear 24*s* (fixable element) of the Ravigneaux type planetary gear mechanism 25 is held stationary (see FIG. 3). Accordingly, the speed of power transmitted from the input shaft 20*i* to the third carrier 23*c* (input element) is increased by the Ravigneaux type planetary gear mechanism 25 so that the rotation speed of the third sun gear 23*s* (second output element) becomes higher than the rotation speed of the third ring gear 23*r* (first output element), and the power is transmitted to the third sun gear 23*s* and the third ring gear 23*r* (see FIG. 2). Thus, during operation of the automatic transmission 20, the third ring gear 23r and the third sun gear 23s of the Ravigneaux type planetary gear mechanism 25 rotate at a rotation speed equal to or higher than that of the third carrier 23c, i.e., the input shaft 20i except when the reverse speed is formed.

In view of this, in the automatic transmission 20, as described above, the engagement oil chamber 150 and the centrifugal oil pressure cancel chamber 190 of the clutch C1 corresponding to the third ring gear 23r are defined by the drum member 130 (support portion 135), the piston 140, and the cancel plate 170 that rotate integrally with the third ring gear 23r. The engagement oil chamber 250 and the centrifugal oil pressure cancel chamber 290 of the clutch C2 corresponding to the third sun gear 23s are defined by the shaft portion 230, the piston 240, and the oil-chamber defining member 270 that rotate integrally with the third sun gear 23s. This enables, during operation of the automatic transmission 20, the rotation speed of the centrifugal oil pressure cancel chambers 190 and 290 of the clutches C1 and C2 to be kept high, and thus the hydraulic oil once supplied can be satisfactorily prevented from flowing out of the centrifugal oil pressure cancel chambers 190 and 290. Consequently, in the automatic transmission 20, the clutches C1 and C2 respectively corresponding to the third ring gear 23r and the third sun gear 23s that are output elements of the Ravigneaux type planetary gear mechanism 25 can be smoothly engaged to satisfactorily secure the shifting performance.

In the automatic transmission 20, the clutch C1 includes the drum member 130 that functions as a clutch drum rotating integrally with the third ring gear 23r, the piston 140 that together with the support portion 135 of the drum member 130 defines the engagement oil chamber 150, and the cancel plate 170 that is fixed to the support portion 135 of the drum member 130 and together with the piston 140 defines the centrifugal oil pressure cancel chamber 190. Furthermore, the clutch C2 includes the clutch hub 200 that is continuously coupled to the third sun gear 23s, the piston 240 that together with the clutch hub 200 defines the centrifugal oil pressure cancel chamber 290, and the oil-chamber defining member 270 that is fixed to the clutch hub 200 and together with the piston 240 defines the engagement oil chamber 250. Accordingly, the engagement oil chamber 150 and the centrifugal oil pressure cancel chamber 190 of the clutch C1 can be defined by members that rotate integrally with the third ring gear 23r (first output element), and the engagement oil chamber 250 and the centrifugal oil pressure cancel chamber 290 of the clutch C2 can be defined by members that rotate integrally with the third sun gear 23s (second output element).

In the automatic transmission 20, as depicted in FIG. 2, the maximum rotation speed of the first and the second sun gears 21s and 22s of the first and the second planetary gears 21 and 22 that are common elements to be connected by the clutches C1 and C2 is the highest among a plurality of rotating elements that are included in the automatic transmission 20 when the output shaft 20o rotates forward (rotates in the forward traveling direction of the vehicle), i.e., among the first to the fourth sun gears 21s to 24s, the first to the third ring gears 21r to 23r, and the first to the third carriers 21c to 23c. In view of this, in the automatic transmission 20, the engagement oil chamber 150 and the centrifugal oil pressure cancel chamber 190 of the clutch C1 are defined by members that rotate integrally with the third ring gear 23r the maximum rotational speed of which is lower than that of the first and the second sun gears 21s and 22s, and the engagement oil chamber 250 and the centrifugal oil pressure cancel chamber 290 of the clutch C2 are defined by members that rotate integrally with the third sun gear 23s the maximum rotational speed of which is lower than that of the first and the second sun gears 21s and 22s. This can reduce the number of constituent members of the clutches C1 and C2 that rotate integrally with the first and the second sun gears 21s and 22s. Consequently, the rotational inertia of the constituent members of the clutches C1 and C2 that rotate integrally with the first and the second sun gears 21s and 22s at high speed, i.e., the drum member 120, and the friction plates 101 and 201, for example, can be reduced, whereby the shifting performance of the automatic transmission 20 can be further improved. Furthermore, in the automatic transmission 20, instead of providing an engagement oil chamber and a centrifugal oil pressure cancel chamber near the first and the second sun gears 21s and 22s the rotational speeds of which significantly change depending on the shift speeds, the engagement oil chambers 150 and 250 and the centrifugal oil pressure cancel chambers 190 and 290 are provided near the third ring gear 23r and the third sun gear 23s in which rotation is relatively stable. This can reduce changes in centrifugal oil pressure for each shift speed to improve the shifting performance.

Even if the first and the second sun gears 21s and 22s that are elements to be connected by the clutches C1 and C2 rotate at significantly high rotation speed, by constituting the drum member 120 shared by the clutches C1 and C2 in the manner described above, deformation of the drum member 120, especially expansion at the open-side end of the drum portion 122 as a clutch drum of the clutch C2 can be satisfactorily suppressed. Specifically, the tubular hub portion 121 as a clutch hub of the clutch C1 is fixed to the drum portion 122 which serves as a clutch drum of the clutch C2 and one end of which is open, at the outer periphery of the open-side end thereof. This can significantly improve the strength of the drum member 120 particularly at the open-side end of the drum portion 122 as a clutch drum of the clutch C2. Thus, even if the rotation speed of the drum member 120, i.e., the first and the second sun gears 21s and 22s becomes higher, deformation thereof, especially expansion of the open-side end of the drum portion 122 can be satisfactorily suppressed.

Furthermore, the hub portion 121 of the drum member 120 includes: the tubular portion 121a onto which the inner peripheral portions of the friction plates 101 of the clutch C1 are fitted; and the annular flange portion 121b that extends radially inward from one end of the tubular portion 121a and is fixed to the outer periphery of the open-side end of the drum portion 122. The flange portion 121b functions as an annular rib. Thus, the strength of the open-side end of the drum portion 122, consequently the strength of the entire drum member 120 can be more satisfactorily improved. The strength of the drum member 120, i.e., the drum portion 122 as a clutch drum can be improved, whereby increase in weight of the drum member 120 (drum portion 122) can be suppressed to reduce the rotational inertia, which enables the shifting performance of the automatic transmission 20 to be improved.

In the automatic transmission 20, the inner peripheral surface of the tubular portion 121a of the hub portion 121 as a clutch hub of the clutch C1 and the outer peripheral surface of the drum portion 122 as a clutch drum of the clutch C2 face each other with a gap interposed therebetween. Thus, between the tubular portion 121a and the drum portion 122, the annular space 121c (oil pocket) is defined that is open on the side opposite to the open-side end of the drum portion 122. Accordingly, hydraulic oil that has passed through the inside, i.e., through the friction plates 201 of the clutch C2 fitted into the drum portion 122 and through the separator plates 202 fitted onto the clutch hub 200 of the clutch C2, and also hydraulic oil scattered around the drum member 120 (drum portion 122) can be received in the space 121c between the hub portion 121 and the drum portion 122. Consequently, hydraulic oil as a lubricating and cooling medium can be supplied from the space 121c to the friction plates 101 of the clutch C1 fitted onto the hub portion 121 and the separator plates 102 of the clutch C1 fitted into the drum member 130.

Thus, in the automatic transmission 20, deformation of the drum member 120 that is shared by the clutches C1 and C2 as a clutch hub for the former and a clutch drum for the latter, i.e., deformation of the drum portion 122 (clutch drum of the clutch C2) that is disposed so as to be surrounded at least partially by constituent members of the clutch C1 can be satisfactorily suppressed. The friction plates 101 fitted onto the hub portion 121 and disposed around the drum portion 122 and the separator plates 102 fitted into the drum member 130 can be satisfactorily lubricated and cooled. By using the drum member 120 (the clutch hub and the clutch drum) as described above for the clutches C1 and C2 that respectively correspond to the third ring gear 23r (first output element) and the third sun gear 23s (second output element) of the Ravigneaux type planetary gear mechanism 25, the automatic transmission 20 can be made compact.

In the automatic transmission 20 structured as described above, the range of changes in torque share of the brake B2 corresponding to the second ring gear 22r of the second planetary gear 22 is wide. Consequently, under conditions in which the torque share of the brake B2 is relatively low (e.g., when the fourth forward speed is formed), when the brake B2 is engaged, oil pressure (hydraulic oil) is supplied from the hydraulic control apparatus 60 only to the first engagement oil chamber 651, and the oil pressure (hydraulic oil) is not supplied to the second engagement oil chamber 652. In contrast, under conditions in which the torque share of the brake B2 is relatively high (e.g., when any of the first to the third forward speeds and the reverse speed is formed), when the brake B2 is engaged, oil pressure (hydraulic oil) is supplied from the hydraulic control apparatus 60 to both of the first and the second engagement oil chambers 651 and 652.

When oil pressure is supplied from the hydraulic control apparatus 60 only to the first engagement oil chamber 651 in order to engage the brake B2, the first piston 641 is moved by the force of the oil pressure in the first engagement oil chamber 651 against the biasing force of the return springs SP6, and accordingly the friction plates 601 and the separator plates 602 are pressed by the plate-pressing portion 641b of the first piston 641 to frictionally engage with each other. When hydraulic oil is supplied only to the first engagement oil chamber 651 in this manner, the second piston 642 stays stationary in the second recessed portion 112 formed in the center support 11c that constitutes part of the transmission case 11, so that the pressure in the second engagement oil chamber 652 does not change and the pressure in the second engagement oil chamber 652 does not become negative. Thus, when the torque share of the brake B2 is relatively low and oil pressure is supplied only to the first engagement oil chamber 651, movement of the first piston 641 is not hindered due to the state of the second piston 642 or the pressure condition in the second engagement oil chamber 652, so that the first piston 641 can be smoothly moved in accordance with the oil pressure to the first engagement oil chamber 651.

When oil pressure is supplied from the hydraulic control apparatus 60 to both of the first and the second engagement oil chambers 651 and 652 in order to engage the brake B2, the second piston 642 is brought into contact with the back surface of the plate-pressing portion 641b of the first piston 641 by the supply of oil pressure to the second engagement oil chamber 652, and presses the first piston 641 toward the friction plates 601 and the separator plates 602. Consequently, the first piston 641 receives both a force caused by the oil pressure in the first engagement oil chamber 651 and a force caused by the oil pressure in the second engagement oil chamber 652 transmitted via the second piston 642 to press the friction plates 601 and the separator plates 602. Thus, when the torque share is relatively high and oil pressure is supplied into both of the first and the second engagement oil chambers 651 and 652, a force caused by the sufficient oil pressure in accordance with the torque share of the brake B2 can be exerted on the first piston 641.

Consequently, whether the torque share of the brake B2 is high or low, an oil pressure in accordance with the torque share can be suitably exerted on the first piston 641 that presses the friction plates 601 and the separator plates 602 to smoothly move the first piston 641. Thus, the shifting performance of the automatic transmission 20 can be satisfactorily improved. In the brake B2, even if oil pressure is supplied only to the second engagement oil chamber 652, the first and the second pistons 641 and 642 can be moved by the oil pressure in the second engagement oil chamber 652 so as to press the friction plates 601 and the separator plates 602 against the biasing force of the return springs SP6, whereby these plates can be caused to frictionally engage with each other.

Furthermore, in the automatic transmission 20, the first recessed portion 111 that together with the first piston 641 defines the first engagement oil chamber 651 is formed in the center support 11c so as to be positioned radially inward of the second recessed portion 112 that together with the second piston 642 defines the second engagement oil chamber 652, and the return springs SP6 are disposed so as to be opposed to the first engagement oil chamber 651. This enables the first engagement oil chamber 651 to be configured in a suitable size as an oil chamber that is used when the torque share of the brake B2 decreases or at an initial stage of shifting, which makes it possible to improve the hydraulic responsiveness and to prevent the consumption rate of hydraulic oil from increasing. Furthermore, the diameters of the seal members disposed between first recessed portion 111 and the first pressure-receiving portion 641a of the first piston 641 can be reduced, whereby the sliding resistance to the first piston 641 can be reduced.

The first recessed portion 111 is formed in the center support 11c, i.e., part of the transmission case 11 so as to be, radially inward of the second recessed portion 112, aligned with the second recessed portion 112 in the radial direction, and the return springs SP6 are disposed so as to at least partially overlap the second recessed portion 112 when viewed from the radial direction. This allows the respective return springs SP6 to axially overlap the second recessed portion 112 and the second piston 642 the second pressure-receiving portion 642a of which is disposed in the second recessed portion 112. This makes it possible to shorten the axial length of the brake B2, consequently the axial length of the automatic transmission 20. Furthermore, the first piston 641 has the annular portion 641c extending radially outward from the first pressure-receiving portion 641a, and the plate-pressing portion 641b extends from the annular portion 641c toward the side opposite to the first pressure-receiving portion 641a. The piston-pressing portion 642b of the second piston 642 presses the annular portion 641c of the first piston 641, and the respective return springs SP6 press the first pressure-receiving portion 641a of the first piston 641. Accordingly, the first piston 641 can be smoothly moved in the axial direction by at least either one of oil pressure in the first engagement oil chamber 651 and oil pressure in the second engagement oil chamber 652. Furthermore, the plate-pressing portion 641b of the first piston 641 extends from the outer peripheral portion of the annular portion 641c, and the plate-pressing portion 641b of the first piston 641 and the piston-pressing portion 642b of the second piston 642 at least partially overlap each other when viewed from the axial direction of the input shaft 20i, for example. This can reduce the bending moment that acts on the vicinity of the base end of the plate-pressing portion 641b when the piston-pressing portion 642b presses the annular portion 641c, in comparison with a case in which, for example, the piston-pressing portion 642b presses the vicinity of the center of the annular portion 641c in the radial direction (case in which the piston-pressing portion 642b does not press the back surface of the plate-pressing portion 641b). Consequently, durability of the first piston 641 can be further improved.

Furthermore, the brake B2 includes: the friction plates 601 and the separator plates 602 that are disposed on the opposite side of the center support 11c from the second planetary gear 22; and the drum member 360 as a brake hub that is continuously coupled to the second ring gear 22r. The drum member 360 is aligned with respect to the transmission case 11 by the outer peripheral surface of the inner tubular portion 115 of the center support 11c between the separator plates 602 and a group of the second planetary gear 22 and the friction plates 601. Furthermore, in the automatic transmission 20, a group of gears constituting the second planetary gear 22 are structured as involute gears (the same applies to the first planetary gear 21 and the Ravigneaux type planetary gear mechanism 25), and the second ring gear 22r is aligned with respect to the intermediate shaft 20m by the second sun gear 22s and the second carrier 22c. The drum member 360 as a brake hub and the second ring gear 22r are coupled together in the rotation direction with radial play (clearance) therebetween.

In this manner, in the automatic transmission 20, the drum member 360 as a brake hub of the brake B2 corresponding to the second ring gear 22r is aligned (radially supported) by the outer peripheral surface of the inner tubular portion 115 of the center support 11c constituting part of the transmission case 11. Thus, the attitude of the drum member 360 can be kept continuously stable even with a larger radial play existing in a coupling portion between the drum member 360 and the second ring gear 22r, i.e., in at least either one of the fitting portion between the inner peripheral portion 221 of the ring gear flange 220 and the distal end portion 367 of the drum member 360 and the fitting portion between the outer peripheral portion 222 of the ring gear flange 220 and the second ring gear 22r. Consequently, in the automatic transmission 20, while the drum member 360 is accurately aligned with respect to the transmission case 11, it is possible to increase play between the drum member 360 and the second ring gear 22r to further enhance the effect of isolating vibrations between the second ring gear 22r and the drum member 360, i.e., the transmission case 11.

Furthermore, by increasing the radial play in the coupling portion between the drum member 360 and the second ring gear 22r, the aligning function of the second planetary gear 22 in which the second ring gear 22r is aligned by the second sun gear 22s and the second carrier 22c can be prevented from being adversely affected by the engagement of the brake B2, and also an excessive force caused by axial center displacement among rotating elements of the second planetary gear 22 can be prevented from being generated during engagement of the brake B2. This can satisfactorily reduce vibrations excited in the second ring gear 22r during engagement of the brake B2. The friction plates 601 and the separator plates 602 of the brake B2 are disposed on the opposite side of the center support 11c from the second planetary gear 22, whereby the path from the second ring gear 22r to the transmission case 11 through the drum member 360, for example, can be lengthened. This can satisfactorily damp vibrations excited in the second ring gear 22r when the second ring gear 22r of the second planetary gear 22 is connected (held stationary) to the transmission case 11 by the brake B2. Furthermore, the attitude of the drum member 360 as a brake hub can be kept continuously stable as described above, which makes it possible to prevent the friction plates 601 and the separator plates 602 from tilting and to reduce variations in torque capacity due to surface pressure imbalance between the plates. Thus, the shifting performance of the automatic transmission 20 can be further improved.

Consequently, in the automatic transmission 20, when the second ring gear 22r of the second planetary gear 22 is connected to the transmission case 11 by the brake B2 to hold the second ring gear 22r stationary, vibrations can be satisfactorily prevented from being transmitted to the transmission case 11, and the shifting performance can be improved.

In the embodiment described above, the drum member 360 as a brake hub has the tubular portion 366 that is coupled to the second ring gear 22r through the center hole of the inner tubular portion 115, and is also radially supported by the outer peripheral surface of the center support 11c (the inner tubular portion 115). The drum member 360 and the second ring gear 22r are coupled together via the annular ring gear flange (coupling member) 220 having the inner peripheral portion 221 fitted onto the distal end portion 367 of the tubular portion 366 and the outer peripheral portion 222 fitted onto the second ring gear 22r. The ring gear flange 220 is fitted onto at least either one of the drum member 360 (the distal end portion 367) and the second ring gear 22r with radial play therebetween. This makes it possible to more accurately align the drum member 360 with respect to the transmission case 11, also to enhance the effect of isolating vibrations between the second ring gear 22r and the drum member 360, i.e., the transmission case 11, and to lengthen the path from the second ring gear 22r to the transmission case 11 through the drum member 360, for example.

Furthermore, in the automatic transmission 20, the drum member 360 is structured so as to function (or, to be used) as a clutch drum of the clutch C3 that interconnects the second ring gear 22r with the third ring gear 23r that is the first output element of the Ravigneaux type planetary gear mechanism 25, and that releases this interconnection. This enables the attitude of the drum member 360 to be kept continuously stable, which can cause the clutch C3 to more smoothly operate to improve the shifting performance, and can reduce the number of components of the automatic transmission 20 to achieve a compact size.

In the automatic transmission 20, at least one of the clutches C1 to C4 and the brakes B1 and B2 may be an intermeshing engagement element such as a dog clutch or a dog brake. For example, in the automatic transmission 20, as the brake B2 that is continuously engaged when the first forward speed to the fourth forward speed are each formed and that is engaged when the reverse speed is formed, a dog brake may be used. In the automatic transmission 20, the gear ratios λ1 to λ4 in the first and the second planetary gears 21 and 22 and the Ravigneaux type planetary gear mechanism 25 are not limited to those exemplified in the above description. Furthermore, in the automatic transmission 20, at least either one of the first and the second planetary gears 21 and 22 may be a double-pinion type planetary gear, and the Ravigneaux type planetary gear mechanism 25 may be replaced with a compound planetary gear train such as a Simpson type or a CR-CR type. The automatic transmission 20 may be modified into a transmission mounted on a front-wheel-drive vehicle.

As described in the foregoing, a multi-stage transmission according to a preferred embodiment is a multi-stage transmission including a brake that connects an element to be held out of a plurality of rotating elements to a case to hold stationary the element to be held and releases this connection, and configured to change speed of power transmitted from a motor of a vehicle to an input member to transmit the power to an output member. In the multi-stage transmission, the brake includes a brake hub continuously coupled to the element to be held; a first friction engagement plate fitted onto the brake hub; a second friction engagement plate fitted onto the case; first and second recessed portions formed in part of the case; a first piston having a first pressure-receiving portion and a plate-pressing portion, the first pressure-receiving portion being disposed in the first recessed portion and together with part of the case defining a first engagement oil chamber, the plate-pressing portion pressing the first and the second friction engagement plates; a second piston having a second pressure-receiving portion and a piston-pressing portion, the second pressure-receiving portion being disposed in the second recessed portion and together with part of the case defining a second engagement oil chamber, the piston-pressing portion being brought into contact with part of the first piston by supply of oil pressure to the second engagement oil chamber and pressing the first piston; and a return spring that biases the first piston so that the first piston moves away from the first and the second friction engagement plates.

The brake included in this multi-stage transmission includes the first and the second recessed portions formed on part of the case, the first and the second pistons, and the return spring that biases the first piston so that the first piston moves away from the first and the second friction engagement plates. The first piston has the first pressure-receiving portion that is disposed in the first recessed portion and together with part of the case defines the first engagement oil chamber, and has the plate-pressing portion that presses the first and the second friction engagement plates. The second piston has the second pressure-receiving portion that is disposed in the second recessed portion and together with part of the case defines the second engagement oil chamber, and has the piston-pressing portion that is brought into contact with part of the first piston by supply of oil pressure to the second engagement oil chamber and presses the first piston.

In the brake thus structured, if oil pressure (hydraulic oil) is supplied only to the first engagement oil chamber, the first piston is moved by the force of the oil pressure in the first engagement oil chamber so as to press the first and the second friction engagement plates against the biasing force of the return spring, whereby the first and the second friction engagement plates can be caused to frictionally engage with each other. When oil pressure is supplied only to the first engagement oil chamber, the second piston stays stationary in the second recessed portion formed in part of the case, so that the pressure in the second engagement oil chamber does not become negative. Thus, when oil pressure is supplied only to the first engagement oil chamber, movement of the first piston is not hindered due to the state of the second piston or the pressure condition in the second engagement oil chamber, so that the first piston can be smoothly moved in accordance with the oil pressure to the first engagement oil chamber.

If oil pressure is supplied to both of the first and the second engagement oil chambers, the second piston is brought into contact with part of the first piston by the supply of the oil pressure to the second engagement oil chamber, and presses the first piston. Accordingly, the first piston, receiving both the force of the oil pressure in the first engagement oil chamber and the force of the oil pressure in the second engagement oil chamber transmitted via the second piston, presses the first and the second friction engagement plates. Consequently, whether the torque share of the brake is high or low, an oil pressure in accordance with the torque share can be suitably exerted on the first piston that presses the first and the second friction engagement plates to smoothly move the first piston, and thus the shifting performance of the multi-stage transmission can be improved. In the brake included in the multi-stage transmission according to a preferred embodiment, needless to say, even if oil pressure is supplied only to the second engagement oil chamber, the first and the second pistons can be moved by the force of the oil pressure in the second engagement oil chamber so as to press the first and the second friction engagement plates against the biasing force of the return spring, whereby the first and the second friction engagement plates can be caused to frictionally engage with each other.

Furthermore, the first recessed portion may be formed in part of the case so as to be aligned with the second recessed portion in a radial direction of the case, and the return spring may be disposed so as to at least partially overlap the second piston when viewed from the radial direction. This allows the return spring to axially overlap the second piston the second pressure-receiving portion of which is disposed in the second recessed portion. This makes it possible to shorten the axial length of the brake, consequently the axial length of the multi-stage transmission.

The first piston may have an annular portion radially extending from the first pressure-receiving portion, the piston-pressing portion of the second piston may press the annular portion of the first piston, and the return spring may press the first pressure-receiving portion of the first piston. This enables the first piston to be smoothly moved in the axial direction by at least either one of the oil pressure in the first engagement oil chamber and the oil pressure in the second engagement oil chamber.

Furthermore, the annular portion may extend radially outward from the first pressure-receiving portion, the plate-pressing portion of the first piston may extend from the outer peripheral portion of the annular portion toward a side opposite to the first pressure-receiving portion, and the plate-pressing portion of the first piston and the piston-pressing portion of the second piston may at least partially overlap each other when viewed from an axial direction of the input member. This can reduce the bending moment that acts on the vicinity of the base end of the plate-pressing portion of the first piston when the piston-pressing portion of the second piston presses the annular portion of the first piston, in comparison with a case in which, for example, the piston-pressing portion presses the vicinity of the center of the annular portion in the radial direction. Consequently, durability of the first piston can be further improved.

The first recessed portion may be formed in part of the case so as to be positioned radially inward of the second recessed portion, and the return spring may be disposed so as to be opposed to the first engagement oil chamber. This enables the first engagement oil chamber to be configured in a suitable size as an oil chamber that is used when the torque share of the brake decreases or at an initial stage of shifting, which makes it possible to improve the hydraulic responsiveness and to prevent the consumption rate of hydraulic oil from increasing. Furthermore, the diameters of the seal members disposed between the first recessed portion and the first pressure-receiving portion of the first piston can be reduced, whereby the sliding resistance to the first piston can be reduced.

Furthermore, the brake hub may be aligned with respect to the case by part of the case. This makes it possible to prevent the first and the second friction engagement plates from tilting and to reduce variations in torque capacity due to surface pressure imbalance between the plates, and thus the shifting performance of the multi-stage transmission can be further improved.

The multi-stage transmission may further include a clutch that interconnects the element to be held with another rotating element and releases this interconnection, and the brake hub may be used as a clutch drum of the clutch and together with a piston of the clutch may define an engagement oil chamber of the clutch. This can reduce the number of components of the multi-stage transmission, and also make the multi-stage transmission compact.

Furthermore, the multi-stage transmission may include: a first planetary gear including a first rotating element, a second rotating element, and a third rotating element that are aligned in order at intervals corresponding to a gear ratio on a speed diagram; a second planetary gear including a fourth rotating element, a fifth rotating element, and a sixth rotating element that are aligned in order at intervals corresponding to a gear ratio on a speed diagram; a Ravigneaux type planetary gear mechanism including an input element, a fixable element, a first output element, and a second output element; first, second, third, and fourth clutches; and first and second brakes. The input element of the Ravigneaux type planetary gear mechanism and the second rotating element of the first planetary gear may be continuously coupled to the input member. The first rotating element of the first planetary gear and the fourth rotating element of the second planetary gear may be continuously coupled together. The fifth rotating element of the second planetary gear and the output member may be continuously coupled together. The first clutch may interconnect the first output element of the Ravigneaux type planetary gear mechanism with the first rotating element of the first planetary gear and the fourth rotating element of the second planetary gear that are continuously coupled together and may release this interconnection. The second clutch may interconnect the second output element of the Ravigneaux type planetary gear mechanism with the first rotating element of the first planetary gear and the fourth rotating element of the second planetary gear that are continuously coupled together and may release this interconnection. The third clutch may be the clutch that interconnects the sixth rotating element of the second planetary gear as the element to be held with the first output element of the Ravigneaux type planetary gear mechanism and releases this interconnection. The fourth clutch may interconnect the third rotating element of the first planetary gear with the fifth rotating element of the second planetary gear and the output member that are continuously coupled together and may release this interconnection. The first brake may connect the fixable element of the Ravigneaux type planetary gear mechanism to a stationary member to hold the fixable element stationary and may release this connection. The second brake may be the brake that connects the sixth rotating element of the second planetary gear as the element to be held to the stationary member to hold the sixth rotating element stationary and releases this connection.

The multi-stage transmission thus embodied includes the Ravigneaux type planetary gear mechanism, the first and the second planetary gears, the first to the fourth clutches, and the first and the second brakes. In this multi-stage transmission, by selectively engaging any three out of the first to the fourth clutches and the first and the second brakes, forward speeds from the first speed to the tenth speed and a reverse speed can be formed. Consequently, in this multi-stage transmission, the spread (gear ratio width=gear ratio of minimum shift speed/gear ratio of maximum shift speed) can be increased to improve power transfer efficiency, i.e., fuel efficiency and acceleration performance of the vehicle, and the step ratio (gear ratio of a certain shift speed/gear ratio of a shift speed that is one speed higher than this certain shift speed) can also be optimized (prevent from increasing) to improve shift feeling. Thus, this multi-stage transmission can satisfactorily improve both power transfer efficiency and drivability.

Furthermore, in this multi-stage transmission, in the same manner as in the case of the input element of the Ravigneaux type planetary gear mechanism, the second rotating element of the first planetary gear is continuously coupled to the input member, and the third rotating element of the first planetary gear is selectively connected to the output member (and the fifth rotating element of the second planetary gear) by the fourth clutch. This can reduce the torque share of the fourth clutch in comparison with, for example, a clutch of a transmission in which a third rotating element of a first planetary gear together with a fifth rotating element of a second planetary gear is continuously coupled to an output member, and a second rotating element of the first planetary gear is selectively connected to an input member, and the clutch selectively connects the second rotating element to the input member. Consequently, the fourth clutch can be made compact at least in either one of the axial direction and the radial direction. Thus, with this multi-stage transmission, both power transfer efficiency and drivability can be improved, and also the entire apparatus can be prevented from upsizing.

In the multi-stage transmission, by engaging the first to the fourth clutches and the first and the second brakes as described below, the forward speeds from the first speed to the tenth speed and the reverse speed can be formed. Specifically, the first forward speed is formed by engaging the first clutch, the second clutch, and the second brake. The second forward speed is formed by engaging the first clutch, the first brake, and the second brake. Furthermore, the third forward speed is formed by engaging the second clutch, the first brake, and the second brake. The fourth forward speed is formed by engaging the fourth clutch, the first brake, and the second brake. Furthermore, the fifth forward speed is formed by engaging the second clutch, the fourth clutch, and the first brake. The sixth forward speed is formed by engaging the first clutch, the fourth clutch, and the first brake. Furthermore, the seventh forward speed is formed by engaging the first clutch, the third clutch, and the fourth clutch. The eighth forward speed is formed by engaging the third clutch, the fourth clutch, and the first brake. Furthermore, the ninth forward speed is formed by engaging the first clutch, the third clutch, and the first brake. Furthermore, the tenth forward speed is formed by engaging the second clutch, the third clutch, and the first brake. The reverse speed is formed by engaging the second clutch, the third clutch, and the second brake.

In the multi-stage transmission thus embodied, by engaging any three engagement elements and disengaging the remaining three engagement elements out of six engagement elements, i.e., the first to the fourth clutches and the first and the second brakes, the first forward speed to the tenth forward speed and the reverse speed are formed. This can reduce the number of engagement elements that are disengaged when each shift speed is formed in comparison with a transmission that, for example, engages two engagement elements and disengages the remaining four engagement elements out of six engagement elements to form a plurality of shift speeds. Consequently, drag loss in the engagement elements that are disengaged when each shift speed is formed can be reduced, whereby the power transfer efficiency of the multi-stage transmission can be further improved.

Furthermore, the output member may be an output shaft coupled to rear wheels of the vehicle via a differential gear. In other words, the multi-stage transmission according to a preferred embodiment may be structured as a transmission mounted on a rear-wheel-drive vehicle. Note that the multi-stage transmission according to a preferred embodiment can be structured as a transmission mounted on a front-wheel-drive vehicle as already described above.

The present invention is not limited to the embodiment described above and, needless to say, various changes may be made without departing from the scope of the present invention. Furthermore, the mode for carrying out the invention described above is merely one specific mode of the invention described only in the Summary, and does not limit the elements of the invention described in the Summary.

The invention claimed is:

1. A multi-stage transmission comprising
an input member;
an output member; and
a brake that connects an element to be held out of a plurality of rotating elements to a case to hold stationary the element to be held and releases this connection, the multi-stage transmission being configured to change speed of power transmitted from a motor of a vehicle to the input member of the multi-stage transmission, with changed speed of power being transmitted to the output member of the multi-stage transmission, the brake comprising:
a brake hub continuously coupled to the element to be held;
a first friction engagement plate fitted onto the brake hub;
a second friction engagement plate fitted onto the case;
first and second recessed portions formed in part of the case, wherein the first recessed portion is formed in a part of the case so as to be aligned with and spaced from the second recessed portion in a radial direction of the case;
a first piston having a first pressure-receiving portion and a plate-pressing portion, the first pressure-receiving portion being disposed in the first recessed portion and together with part of the case defining a first engagement oil chamber, the plate-pressing portion pressing the first and the second friction engagement plates;
a second piston having a second pressure-receiving portion and a piston-pressing portion, the second pressure-receiving portion being disposed in the second recessed portion and together with part of the case defining a second engagement oil chamber, the piston-pressing portion being brought into contact with part of the first piston by supply of oil pressure to the second engagement oil chamber and pressing the first piston; and
a return spring that biases the first piston so that the first piston moves away from the first and the second friction engagement plates.

2. The multi-stage transmission according to claim 1, wherein
the return spring is disposed so as to at least partially overlap the second piston when viewed from the radial direction.

3. The multi-stage transmission according to claim 2, wherein
the first piston has an annular portion radially extending from the first pressure-receiving portion,
the piston-pressing portion of the second piston presses the annular portion of the first piston, and
the return spring presses the first pressure-receiving portion of the first piston.

4. The multi-stage transmission according to claim 3, wherein
the annular portion extends radially outward from the first pressure-receiving portion,
the plate-pressing portion of the first piston extends from an outer peripheral portion of the annular portion toward a side opposite to the first pressure-receiving portion, and
the plate-pressing portion of the first piston and the piston-pressing portion of the second piston at least partially overlap each other when viewed from an axial direction of the input member.

5. The multi-stage transmission according to claim 4, wherein
the first recessed portion is formed in part of the case so as to be positioned radially inward of the second recessed portion, and
the return spring is disposed so as to be opposed to the first engagement oil chamber.

6. The multi-stage transmission according to claim 5, wherein
the brake hub is aligned with respect to the case by part of the case.

7. The multi-stage transmission according to claim 6, further comprising
a clutch that interconnects the element to be held with another rotating element and releases this interconnection, wherein
the brake hub is used as a clutch drum of the clutch and together with a piston of the clutch defines an engagement oil chamber of the clutch.

8. The multi-stage transmission according to claim 7, comprising:
a first planetary gear including a first rotating element, a second rotating element, and a third rotating element that are aligned in order at intervals corresponding to a gear ratio on a speed diagram;
a second planetary gear including a fourth rotating element, a fifth rotating element, and a sixth rotating element that are aligned in order at intervals corresponding to a gear ratio on a speed diagram;
a Ravigneaux type planetary gear mechanism including an input element, a fixable element, a first output element, and a second output element;
first, second, third, and fourth clutches; and
first and second brakes, wherein
the input element of the Ravigneaux type planetary gear mechanism and the second rotating element of the first planetary gear are continuously coupled to the input member,
the first rotating element of the first planetary gear and the fourth rotating element of the second planetary gear are continuously coupled together,
the fifth rotating element of the second planetary gear and the output member are continuously coupled together,
the first clutch interconnects the first output element of the Ravigneaux type planetary gear mechanism with the first rotating element of the first planetary gear and the fourth rotating element of the second planetary gear that are continuously coupled together and releases this interconnection,
the second clutch interconnects the second output element of the Ravigneaux type planetary gear mechanism with the first rotating element of the first planetary gear and the fourth rotating element of the second planetary gear that are continuously coupled together and releases this interconnection,
the third clutch is the clutch that interconnects the sixth rotating element of the second planetary gear as the element to be held with the first output element of the Ravigneaux type planetary gear mechanism and releases this interconnection,
the fourth clutch interconnects the third rotating element of the first planetary gear with the fifth rotating element of the second planetary gear and the output member that are continuously coupled together and releases this interconnection,
the first brake connects the fixable element of the Ravigneaux type planetary gear mechanism to a stationary member to hold the fixable element stationary and releases this connection, and
the second brake is the brake that connects the sixth rotating element of the second planetary gear as the element to be held to the stationary member to hold the sixth rotating element stationary and releases this connection.

9. The multi-stage transmission according to claim 8, wherein
a first forward speed is formed by engaging the first clutch, the second clutch, and the second brake,
a second forward speed is formed by engaging the first clutch, the first brake, and the second brake,
a third forward speed is formed by engaging the second clutch, the first brake, and the second brake,
a fourth forward speed is formed by engaging the fourth clutch, the first brake, and the second brake,
a fifth forward speed is formed by engaging the second clutch, the fourth clutch, and the first brake,
a sixth forward speed is formed by engaging the first clutch, the fourth clutch, and the first brake,
a seventh forward speed is formed by engaging the first clutch, the third clutch, and the fourth clutch,
an eighth forward speed is formed by engaging the third clutch, the fourth clutch, and the first brake,
a ninth forward speed is formed by engaging the first clutch, the third clutch, and the first brake,
a tenth forward speed is formed by engaging the second clutch, the third clutch, and the first brake, and
a reverse speed is formed by engaging the second clutch, the third clutch, and the second brake.

10. The multi-stage transmission according to claim 9, wherein
the output member is an output shaft coupled to a rear wheel of the vehicle via a differential gear.

11. The multi-stage transmission according to claim 1, wherein
the first recessed portion is formed in part of the case so as to be positioned radially inward of the second recessed portion, and
the return spring is disposed so as to be opposed to the first engagement oil chamber.

12. The multi-stage transmission according to claim 11, wherein
the brake hub is aligned with respect to the case by part of the case.

13. The multi-stage transmission according to claim 2, wherein
the first recessed portion is formed in part of the case so as to be positioned radially inward of the second recessed portion, and
the return spring is disposed so as to be opposed to the first engagement oil chamber.

14. The multi-stage transmission according to claim 13, wherein
the brake hub is aligned with respect to the case by part of the case.

15. The multi-stage transmission according to claim 3, wherein
the first recessed portion is formed in part of the case so as to be positioned radially inward of the second recessed portion, and
the return spring is disposed so as to be opposed to the first engagement oil chamber.

16. The multi-stage transmission according to claim 15, wherein
the brake hub is aligned with respect to the case by part of the case.

17. The multi-stage transmission according to claim 1, wherein
the brake hub is aligned with respect to the case by part of the case.

18. The multi-stage transmission according to claim 2, wherein
the brake hub is aligned with respect to the case by part of the case.

19. The multi-stage transmission according to claim 3, wherein
the brake hub is aligned with respect to the case by part of the case.

20. The multi-stage transmission according to claim 4, wherein
the brake hub is aligned with respect to the case by part of the case.

* * * * *